Oct. 4, 1966    A. J. USKO ET AL    3,276,356
METHODS AND APPARATUS FOR HANDLING AND FORMING
INDICIA ON ARTICLES
Filed Oct. 2, 1964    8 Sheets-Sheet 1
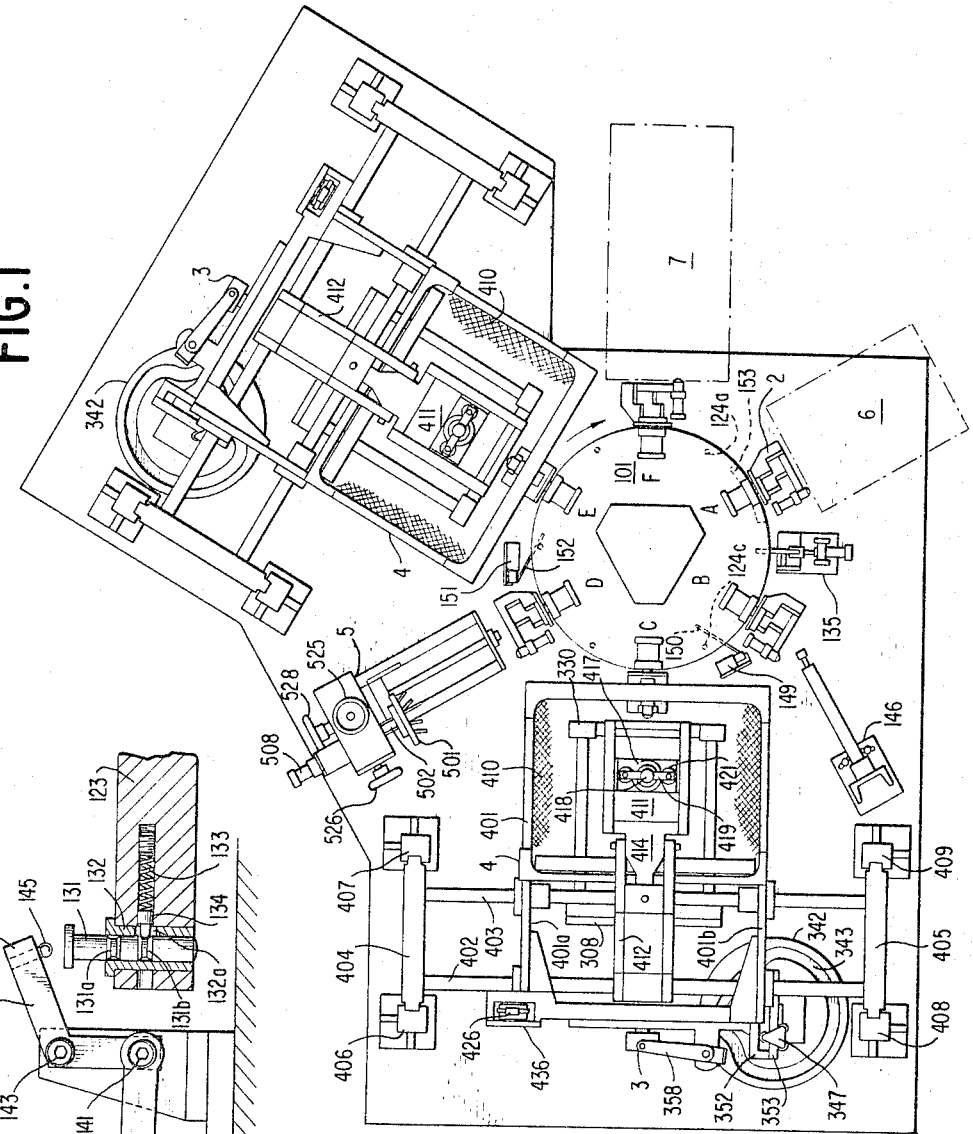
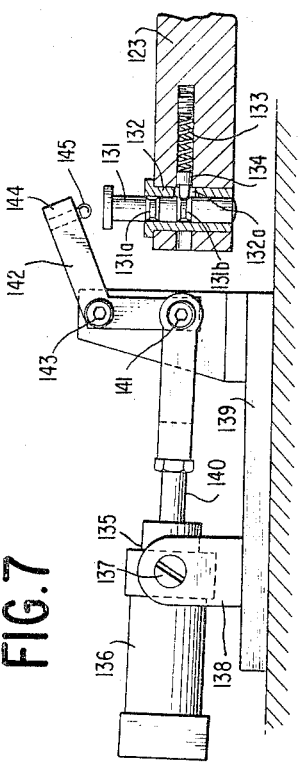
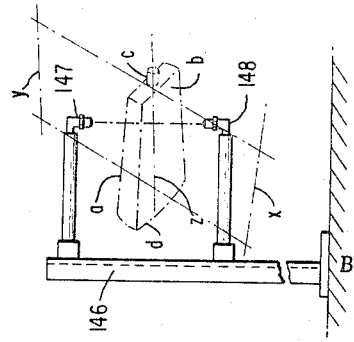
INVENTORS
ALEXANDER J. USKO
JOSEPH D. GILLIS
BY Burns, Doane, Benedict,
Swecker & Mathis
ATTORNEYS

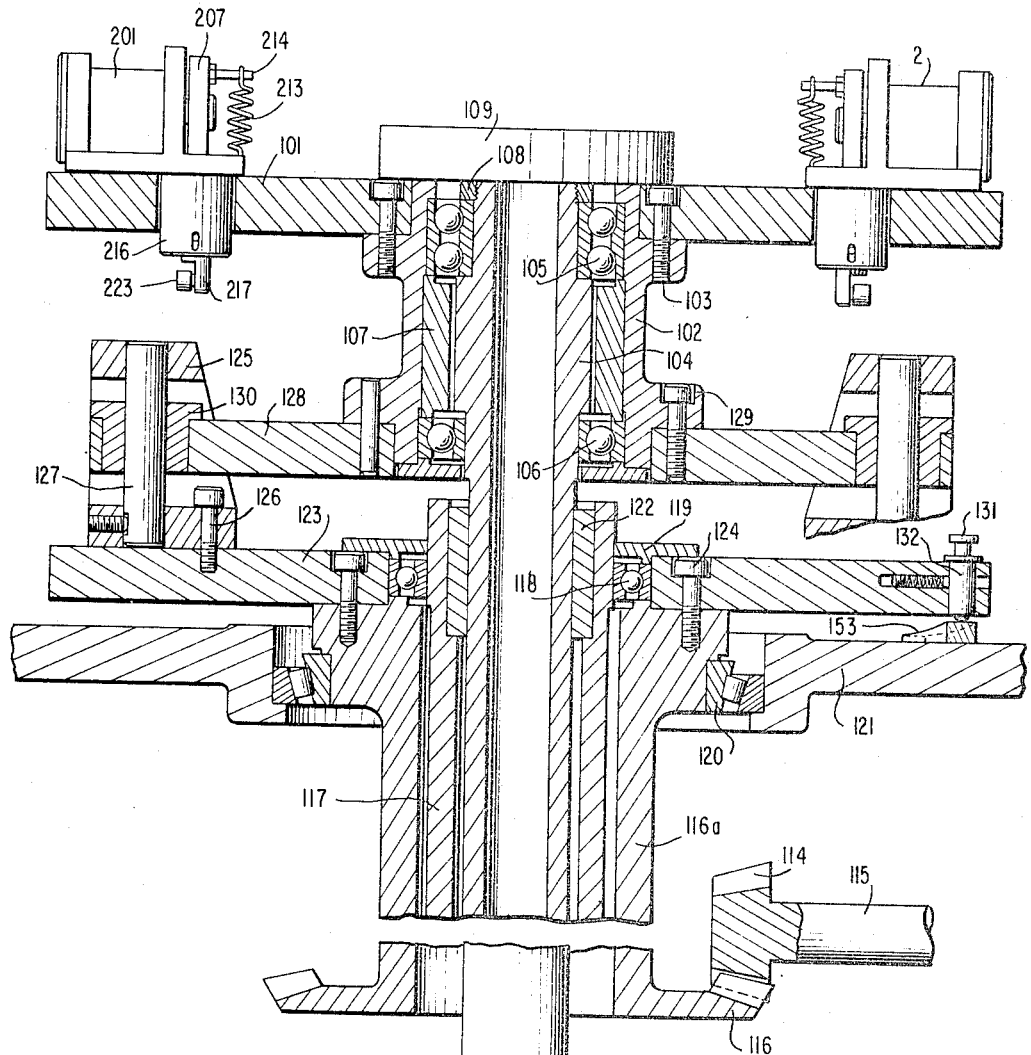
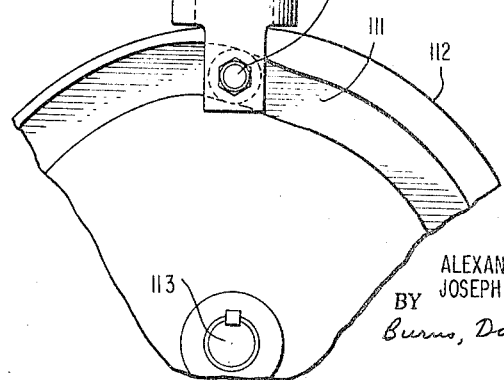
FIG.2

Oct. 4, 1966   A. J. USKO ET AL   3,276,356
METHODS AND APPARATUS FOR HANDLING AND FORMING
INDICIA ON ARTICLES
Filed Oct. 2, 1964   8 Sheets-Sheet 3
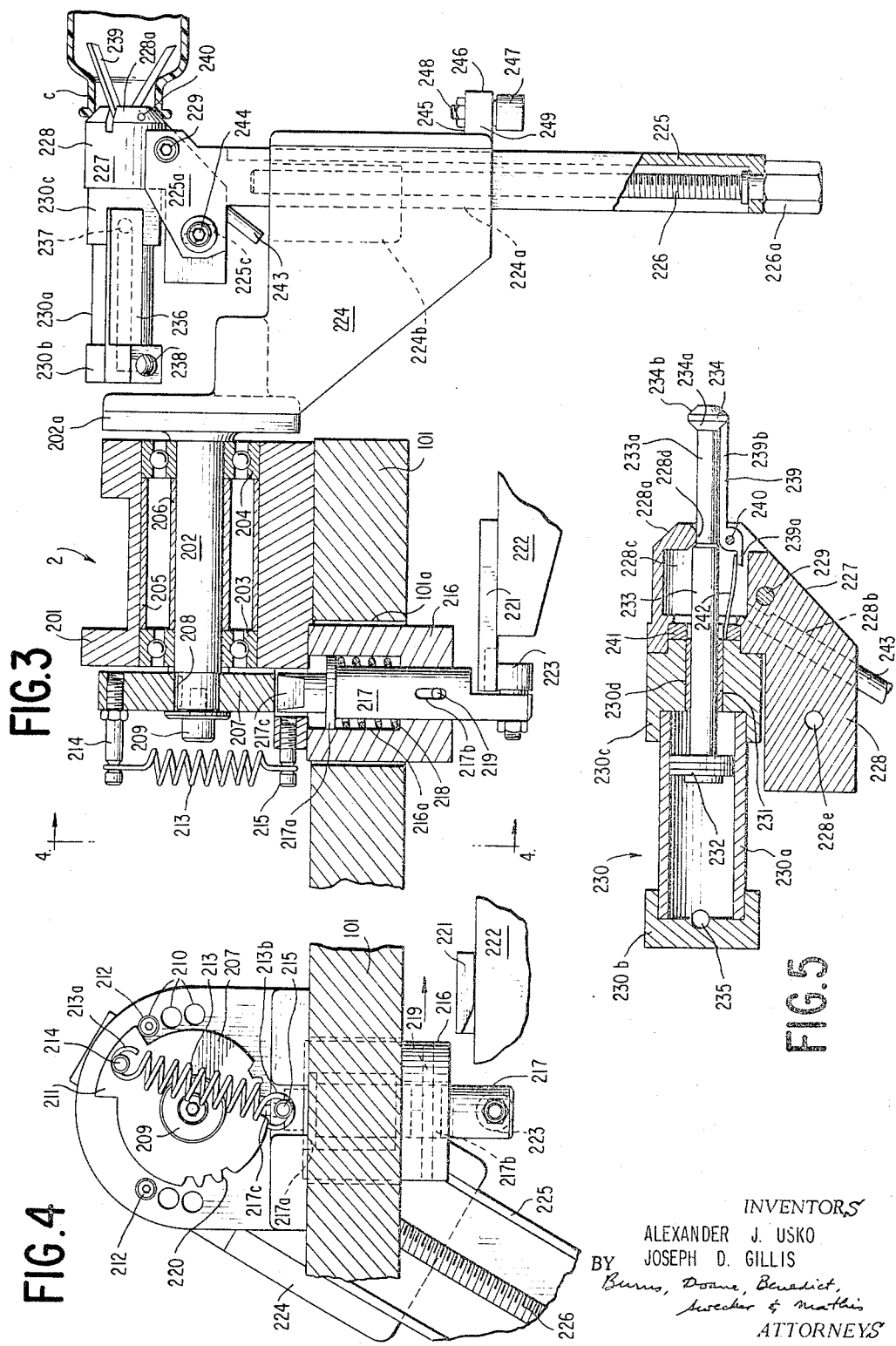
INVENTORS
ALEXANDER J. USKO
JOSEPH D. GILLIS
BY Burns, Doane, Benedict,
Swecker & Mathis
ATTORNEYS

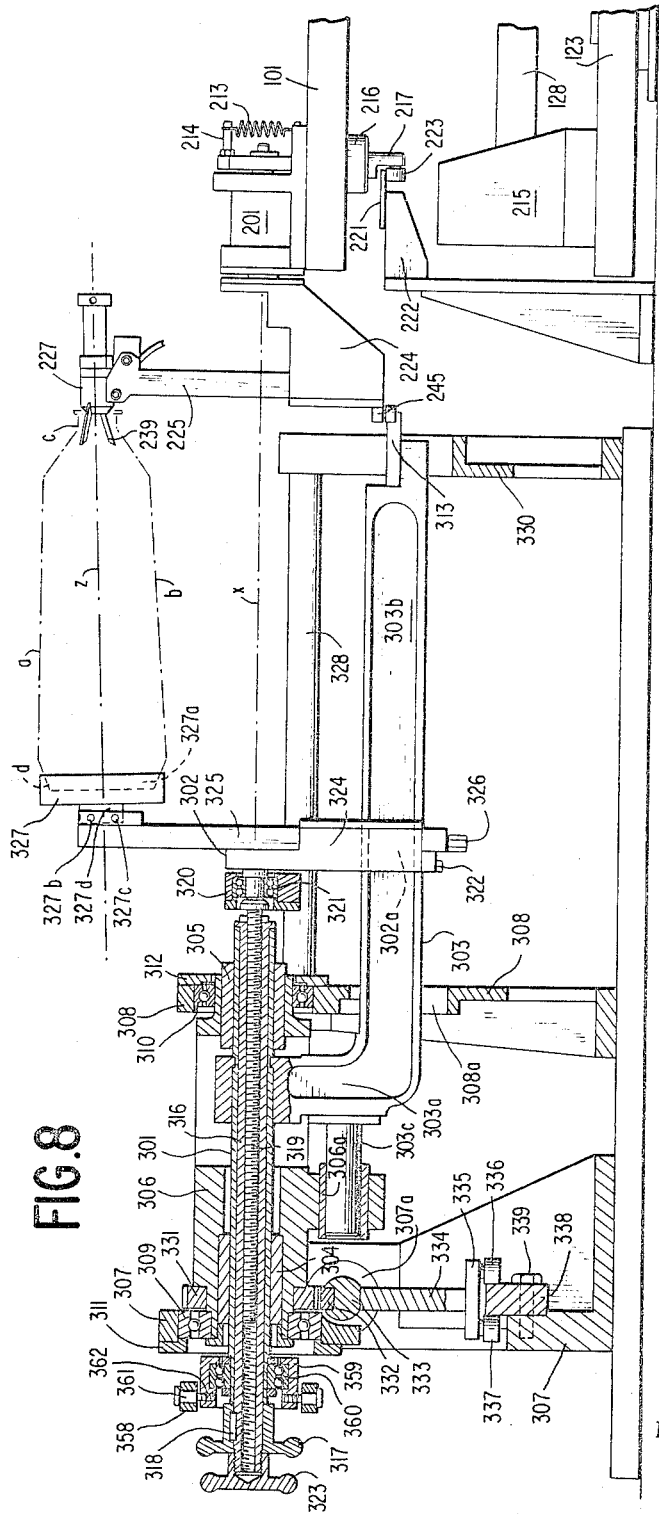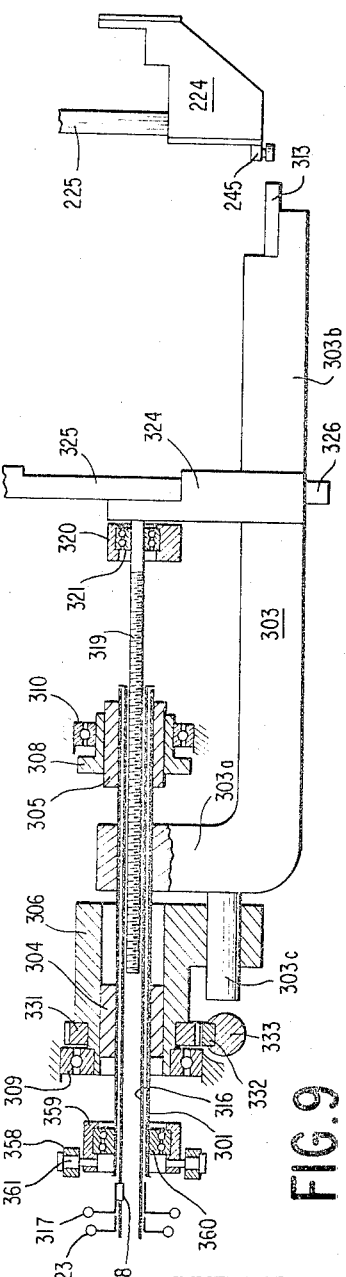

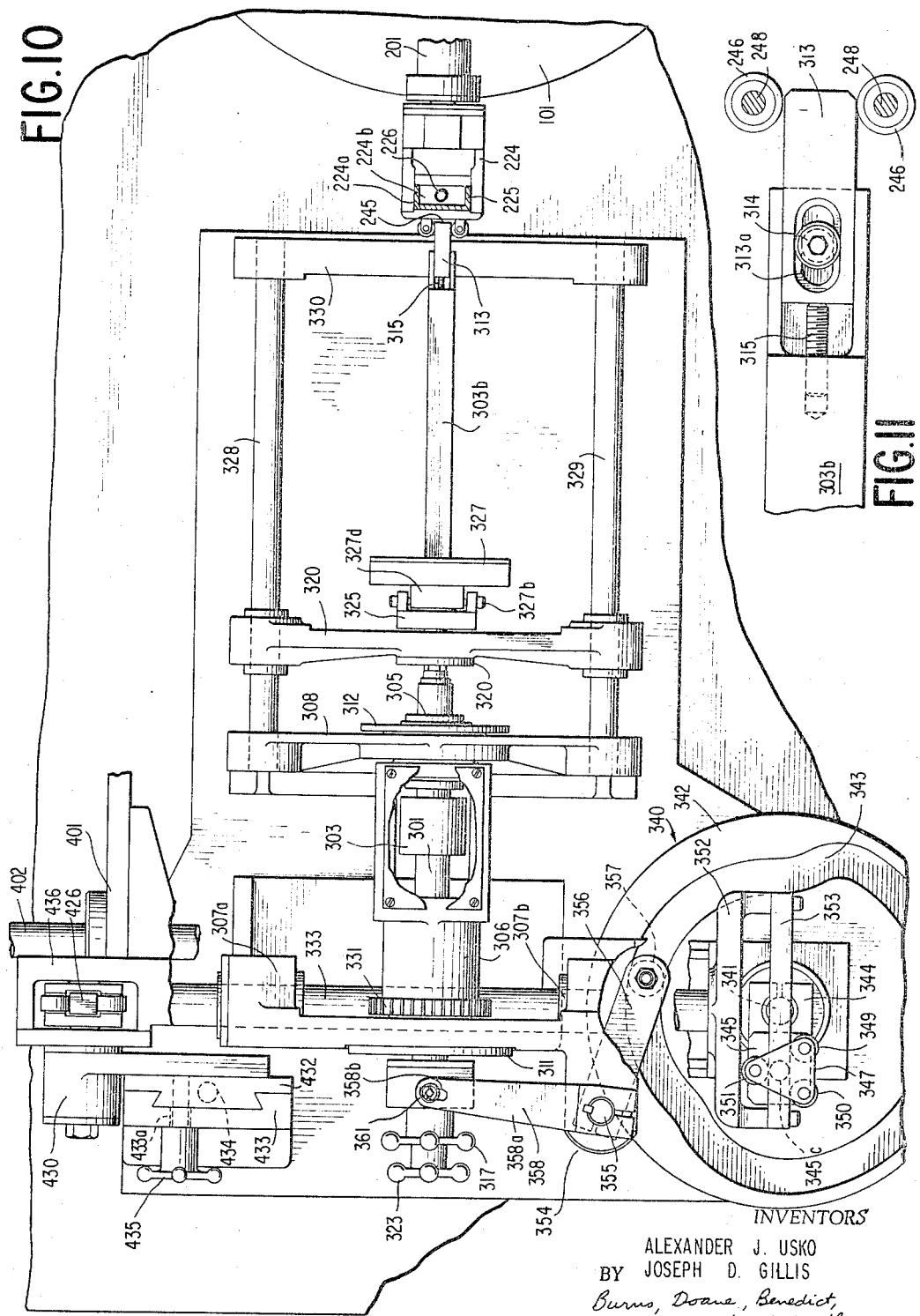

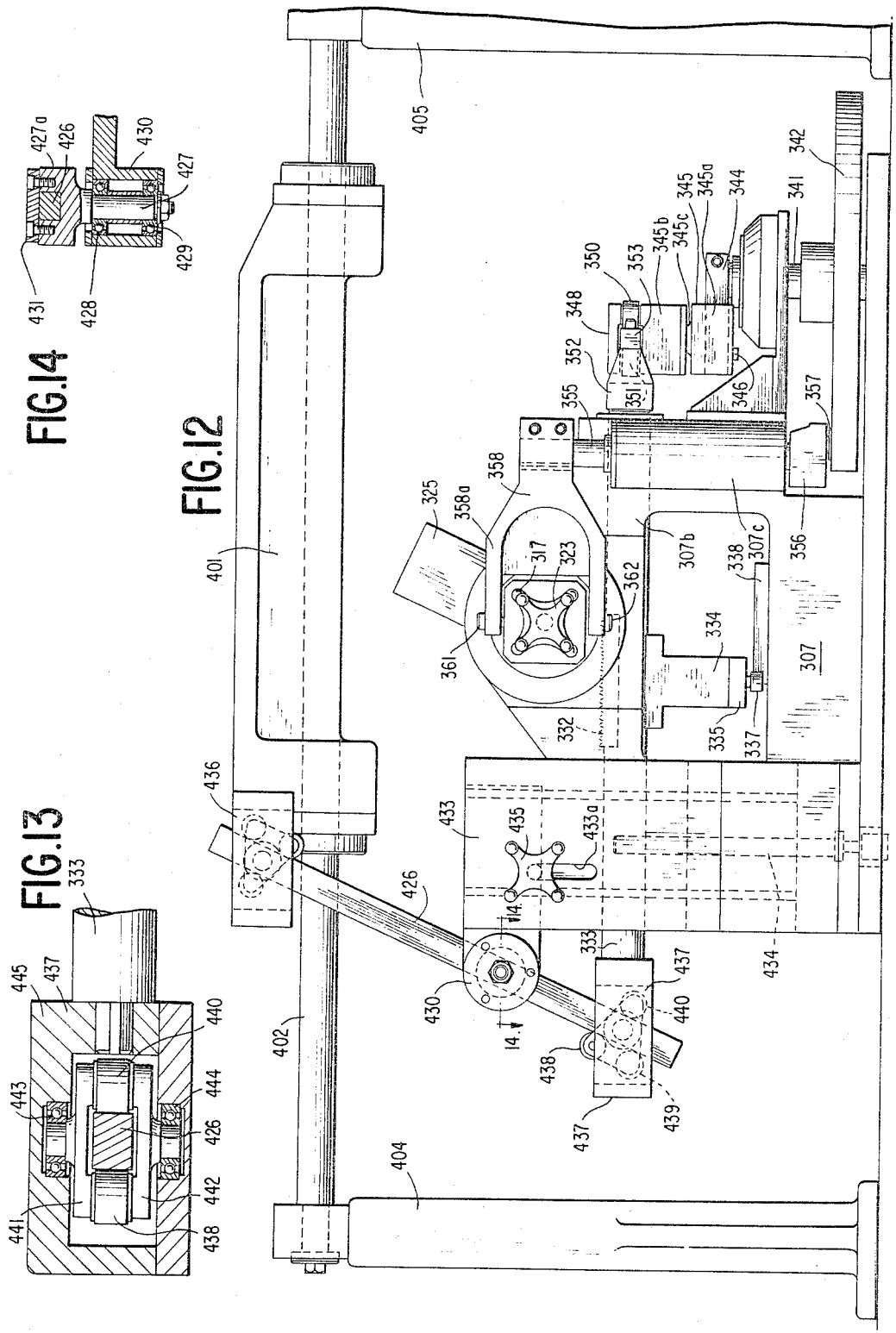

Oct. 4, 1966    A. J. USKO ET AL    3,276,356
METHODS AND APPARATUS FOR HANDLING AND FORMING
INDICIA ON ARTICLES
Filed Oct. 2, 1964    8 Sheets-Sheet 7

FIG.15

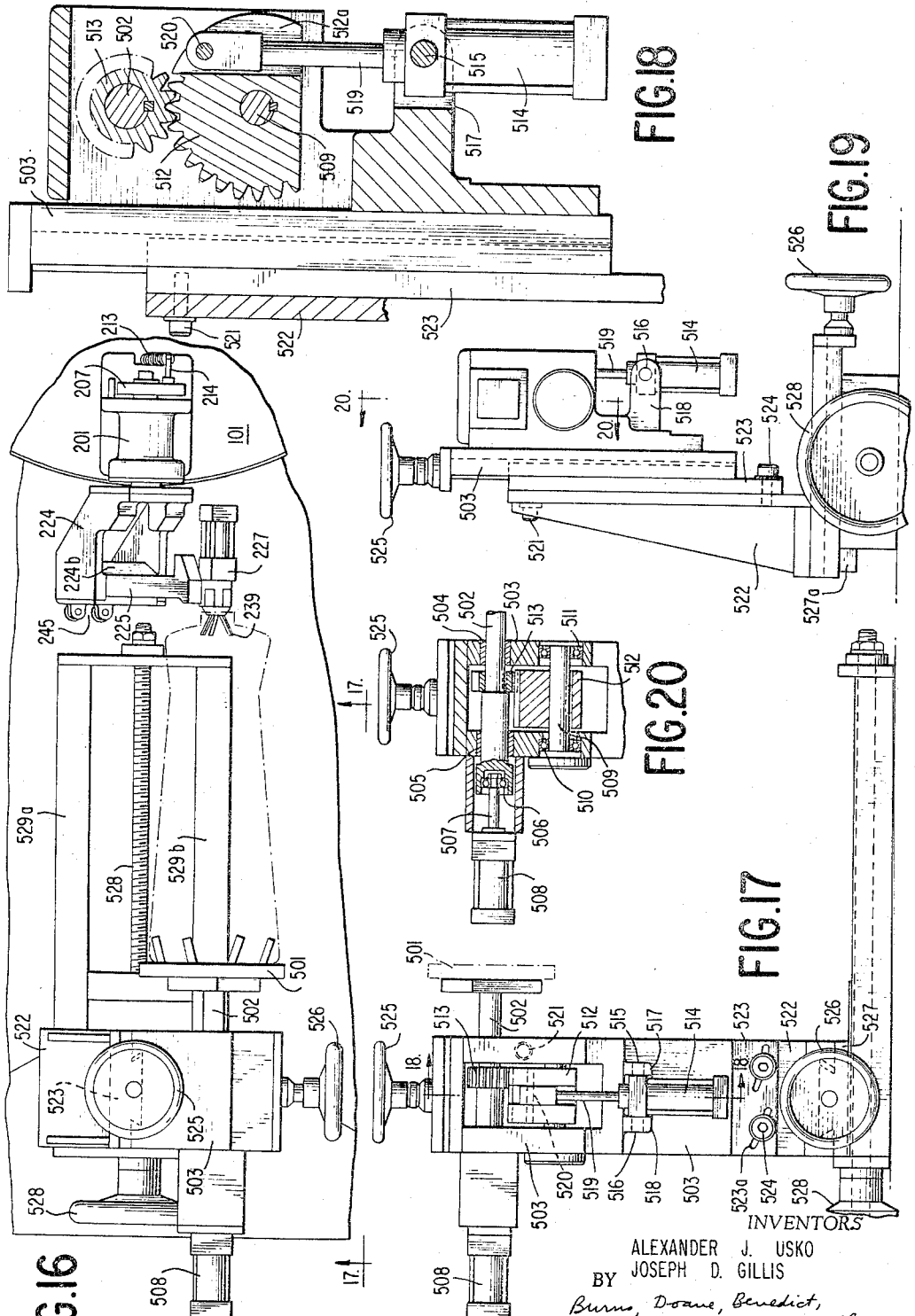

United States Patent Office 3,276,356
Patented Oct. 4, 1966

3,276,356
METHODS AND APPARATUS FOR HANDLING AND FORMING INDICIA ON ARTICLES
Alexander J. Usko, Wapping, and Joseph D. Gillis, Windsor Locks, Conn., assignors to Monsanto Company, St. Louis, Mo., a corporation of Delaware
Filed Oct. 2, 1964, Ser. No. 400,984
20 Claims. (Cl. 101—40)

This invention relates to methods and apparatus for handling and forming indicia on articles. In particular it relates to a screen-type printing apparatus and its mode of operation, which apparatus is employed to print two arcuate article portions having different axes of cylindrical curvature.

There now exists a substantial commercial demand for the printing of two or more arcuate surfaces on hollow articles such as bottles which are blow molded from polyethylene. A large number of these bottles possess a generally oval configuration, i.e. they include two arcuate surfaces, each having a different axis of cylindrical configuration disposed outside the bottle, which surfaces are generally symmetrically arranged with reference to the central axis of the bottle. The two axes of cylindrical configuration of these two arcuate surfaces are mutually spaced, either mutually inclined or parallel, and coplanar with the bottle central axis.

The printing of oval bottles such as those above described has engendered substantial problems. Such problems relate generally to techniques for handling the articles to effect the successful printing of the two arcuate surfaces in succession while maintaining accurate printing registration and while printing articles at a high rate of speed.

Viewing the now available, commercial printing devices in perspective, it is apparent that there is a need for improved printing techniques. In particular, there is a need for techniques which enable the printing of articles such as oval bottles wherein the manipulations of such articles during multiple-printing operations are minimized. There is an additional and related need for improved techniques wherein the mechanical manipulations of printing apparatus components are such as to balance or minimize the forces exerted on the apparatus so that the size of the structural components of the apparatus may be reduced, printing speed increased, and the accuracy of printing improved.

An additional need exists to reduce the overall complexity of printing techniques and apparatus employed to print oval articles. In reducing such complexity, it would be desirable to minimize the position changes of bottles and the transferring of bottles from one component to another during multiple-surface, printing operations.

It is also apparent that there now exists a need for a simplified and improved arrangement for supporting articles, such as oval bottles, on turret-type printing mechanisms for multiple-surface printing operations and for causing such articles supported on a turret to move in indicia-forming relationship with printing means such as reciprocating screens.

Through this invention there are presented methods and apparatus which substantially fulfill the needs hereinbefore set forth.

In particular, it is an object of the invention to provide improved printing methods and apparatus which minimize the movements of an article, such as an oval bottle, required to effect the printing of two arcuate surfaces having different axes of cylindrical curvature.

It is also an object of the invention to provide such improved methods and apparatus wherein the forces exerted on at least some major apparatus components are substantially balanced so as to improve the speed and accuracy of the overall printing operation.

It is likewise an object of the invention to provide such improved printing methods and apparatus by means of which structural and operational complexities are substantially reduced.

Yet another object of the invention is to provide such improved methods and apparatus wherein the position changes of articles and the steps of transferring articles from one apparatus component to another are substantially minimized during an automatic, two-surface-printing operation.

A still further object of the invention is to provide improved and simplified apparatus components for supporting articles such as oval bottles on a turret for multiple-surface printing and for causing such articles to move in indicia-forming contact with printing means such as screen-printing devices.

It is likewise an object of the invention to provide an apparatus including an improved, simplified and reliable control system responsive to the presence or absence of articles on article-supporting components.

In accomplishing the foregoing objectives, there is presented an overall invention encompassing a variety of method and apparatus aspects. The invention is presented in the context of a preferred apparatus for printing two arcuate article surfaces having different but symmetrical axes of cylindrical curvature.

One such method and apparatus aspect entails the mounting of an article on supporting means such that the axis of cylindrical curvature of a first article surface to receive indicia substantially coincides with a pivot axis of such article-supporting means. The article is pivoted about this pivot axis so that it is moved through an arc in one direction. In so moving, the first article surface is moved in tangential, indicia-forming contact with indicia-forming means. The position of the article on the article-supporting means is then changed such that the axis of cylindrical curvature of a second article surface to receive indicia substantially coincides with the pivot axis of the article-supporting means. The article is then pivoted about the pivot axis such that it is moved through an arc in a direction opposite to the aforesaid one direction so as to move the second article surface in tangential, indicia-forming contact with indicia-forming means. The indicia means above referred to may comprise two separately supported printing screens, each adapted to print one article surface.

An additional aspect of the invention involves an apparatus including turret means and a plurality of article-engaging means connected with this turret means. A first, screen-printing means is mounted for reciprocation as is a second, screen-printing means. Means are provided for causing the first and second screen-printing means to undergo reciprocating movement with the first screen-printing means and second screen-printing means moving in a generally symmetrical or mirror-image relationship with respect to a median plane passing through the axis of the turret means. During such joint movements of the first and second screen-printing means, they each move in tangential printing contact with an article engaged by article-engaging means.

Yet another aspect of the invention relates to an apparatus including transporting means and a plurality of article-engaging arm means which are pivotally connected with this transporting means. Arm-driving means are provided adjacent the transporting means to individually and sequentially engage and pivot each arm means on the transporting means when the transporting means is stationary, with the arm driving means being adapted to be disengaged from each of the arm means while the transporting means is stationary and remain disengaged while the transporting means is in motion.

A particularly significant, overall aspect of the invention relates to a combination including turret means having an axis of rotation and a plurality of pivotable arm means carried in spaced relation on this turret means. Each of these arm means has a pivot axis extending generally radially of the axis of rotation of the turret means and has an article-engaging portion spaced radially from its own pivot axis. A first printing means is mounted adjacent the turret means and a second printing means, spaced from the first printing means is also mounted adjacent the turret means. A first arm driving means, disposed adjacent the turret means, is adapted to sequentially engage each of the arm means, pivot each of the arm means in one direction so that a first surface of an article engaged thereby is moved in tangential, indicia-forming contact with the first printing means, and disengage each of the arm means. A second arm driving means, also disposed adjacent the turret means is adapted to sequentially engage each of the arm means, pivot each of the arm means in a direction opposite to the aforesaid one direction so that a second surface of an article carried thereby is moved in tangential, indicia-forming contact with the second printing means, and disengage each of the arm means. An article-position-changing means is disposed adjacent the turret means and between the first and second printing means. This article-position-changing means is adapted to sequentially engage articles supported by each of the arm means and rotate these articles about their central axes. Means are also included in this combination for reciprocably moving the turret means along its axis of rotation whereby articles carried on two different arm means may be moved in unison toward the first and second printing means, the two articles may be moved in unison in tangential, indicia-forming contact with the first and second printing means, and the two articles may be moved in unison away from the first and second printing means to facilitate rotation of the turret means about its axis of rotation with the articles displaced from the first and second printing means.

Additional improvements presented through the invention, entail specific structural details of apparatus components such as a mechanism for engaging and gripping hollow article ends, a mechanism for controlling the operation of work stations in response to the condition of article-supporting means, a unique, triple, roller bearing mechanism for connecting relatively moving components, a mechanism for changing the position of articles between printing steps while supported on arm means, a mechanism for positively controlling the position of article-engaging, arm means during a multi-step, printing operation, and a drive mechanism for engaging, pivoting and disengaging arm means.

In describing the invention, reference will be made to a preferred apparatus embodiment illustrated in the accompanying drawings.

In the drawings:

FIGURE 1 is a schematic, plan view of an overall apparatus which may be employed to effect the automatic, sequential printing of two arcuate bottle surfaces, each of which surfaces has a different cylindrical article of curvature and wherein the two axes of curvature are either mutually parallel or inclined and disposed outside of the bottle periphery;

FIGURE 2 is an enlarged, schematic, sectioned, and fragmentary, elevational view of a portion of the FIGURE 1 apparatus illustrating components employed to effect rotary and axially reciprocating movement of an article transporting turret incorporated in the FIGURE 1 apparatus;

FIGURE 3 is an enlarged, schematic, fragmentary, and sectioned, elevational view of a portion of a representative arm means carried by the turret of the FIGURE 1 apparatus;

FIGURE 4 is a transverse, sectional view of an arm means portion of the FIGURE 1 apparatus as viewed along the section line 4—4 of FIGURE 3;

FIGURE 5 is a still further enlarged, schematic, fragmentary and sectioned, elevational view of a bottle-neck-gripping component associated with each of the arm means of the FIGURE 1 apparatus;

FIGURE 6 is an enlarged, fragmentary, and schematic, side elevational view of a portion of the FIGURE 1 apparatus illustrating a photoelectric sensing arrangement employed to detect the absence of articles on each of the arm means of the FIGURE 1 apparatus;

FIGURE 7 is an enlarged, schematic, and partially sectioned, side elevational view of a hammer mechanism employed to depress control pins mounted on a pin plate associated with the turret of the FIGURE 1 apparatus;

FIGURE 8 is an enlarged, partially sectioned, fragmentary and schematic side elevational view of a portion of the FIGURE 1 apparatus illustrating the mode of cooperation of a representative arm means and a representative arm-driving means of this apparatus;

FIGURE 9 is a further enlarged, schematic, partially sectioned, fragmentary and side elevational view of major portions of the arm means and arm-driving means shown in FIGURE 8 illustrating these components in their disengaged relationship;

FIGURE 10 is an enlarged, schematic, and fragmentary, plan view of a portion of the FIGURE 1 apparatus illustrating structural details of a mechanism employed to effect the operation of the arm-driving means shown in FIGURES 8 and 9;

FIGURE 11 is a still further enlarged, schematic and fragmentary, plan view of a portion of the arm-driving means shown in FIGURES 8 and 9 which sequentially engages each arm means;

FIGURE 12 is an enlarged, schematic, and fragmentary, side elevational view of the FIGURE 10 assembly, viewing the assembly from the left as shown in FIGURE 10 and omitting the ink distributing mechanism there shown;

FIGURE 13 is a still further enlarged, fragmentary and partially sectioned, plan view of a connector portion of the FIGURE 12 apparatus employed to connect a horizontally reciprocating drive bar with a pivoted lever, which lever effects coordinated operation of a reciprocating screen-printing mechanism and an arm-driving means;

FIGURE 14 is an enlarged, fragmentary, schematic, and partially sectioned plan view of a pivot mount for the transfer lever of the FIGURE 12 assembly as viewed along the section line 14—14 of FIGURE 12;

FIGURE 15 is an enlarged, fragmentary, and schematic, side elevational view of the FIGURE 10 assembly viewing this assembly from the lower side of FIGURE 10;

FIGURE 16 is an enlarged, schematic and fragmentary, plan view of a portion of the FIGURE 1 apparatus illustrating the mode of cooperation of an arm means with an article-position-changing mechanism;

FIGURE 17 is an enlarged, schematic and fragmentary, elevational view of the article-position-changing mechanism shown in FIGURE 16 as viewed along the view direction 17—17 of FIGURE 16;

FIGURE 18 is a still further enlarged, fragmentary and sectioned, elevational view of a portion of the FIGURE 17 assembly as viewed along the section line 18—18 of FIGURE 17;

FIGURE 19 is an enlarged, fragmentary and schematic, elevational view of the FIGURE 16 assembly as viewed along the view direction 19—19 of FIGURE 16; and FIGURE 20 is an enlarged, fragmentary, schematic and sectioned, elevational view of a portion of the FIGURE 16 assembly as viewed along the section line 20—20 of FIGURE 19.

Principal apparatus components and their general mode of operation

In discussing the basic components and mode of operation of the apparatus schematically shown in FIGURE 1, initial reference should be made to a type of article which this apparatus is specifically adapted to handle and print.

An article to be printed by the FIGURE 1 apparatus is conventionally termed an "oval" bottle and is often blow molded from plastic such as polyethylene. The geometric characteristics of this bottle are described in detail in the pending application of Robert W. Marquiss, Ser. No. 257,228, filed Feb. 8, 1963 and entitled Method and Apparatus for Forming Indicia on Articles.

This article, as schematically illustrated in FIGURE 6 and FIGURE 8, includes a first arcuate surface $a$ having an axis of cylindrical curvature $x$ and a second arcuate surface $b$ having an axis of cylindrical curvature $y$. Curvature axes $x$ and $y$, which may be mutually inclined or parallel, are substantially coplanar with, and symmetrically arranged with reference to, a central bottle axis $z$. As further shown in FIGURE 8, each such bottle includes an open ended neck $c$ and a closed end or base $d$.

Each bottle to be printed is moved generally horizontally through a variety of work stations as shown in FIGURE 1 to effect the printing of bottle sides $a$ and $b$.

A horizontally rotatable, bottle transporting, turret assembly 1, pivotably supports a plurality of bottle engaging and supporting arms 2. As shown in FIGURE 1, six, symmetrically arranged arm means 2 are adapted to sequentially cooperate with arm driving units 3 such that bottles carried by the arms 2 are printed by screen-printing units 4. After a first bottle side $a$ has been printed, the bottle is rotated about its central axis $z$ by a bottle rotating mechanism 5 to properly position the bottle for the printing of the second side $b$.

Bottles to be printed may be supplied to turret 1 by a bottle-loading mechanism 6 of the general type, for example, as that described in the pending Berthold et al. application Ser. No. 219,210, filed Aug. 24, 1962, and entitled Mechanism for Handling and Forming Indicia on Articles.

Bottles which have been printed on both sides $a$ and $b$ may be removed from the turret 1 by a turret unloading mechanism 7 of the general type, for example, as that described in detail in the aforesaid pending Berthold et al. application.

Each bottle supported upon an arm means 2 is moved horizontally by turret assembly 1 through a sequence of work stations disposed at 60° increments around the axis of rotation of the turret 1.

A bottle carried on an arm means 2 and positioned at station A in alignment with loading station 6 receives a bottle with its first surface $a$ so oriented that its axis of curvature $x$ substantially coincides with a pivot axis of the bottle-supporting arm 2. This pivot axis, as will be hereinafter described, extends horizontally and radially of the axis of rotation of the turret 1. With a loading mechanism such as that described in the Berthold et al. disclosure, bottles will be moved generally axially toward the arm means 2.

The turret is indexed 60° so as to bring the bottle to a scanning station B. At this station, a scanning mechanism to be hereinafter described determines the presence or absence of a bottle on the arm means 2. In the event of the absence of a bottle, a control mechanism associated with the turrent assembly 1 is actuated so as to prevent the operation of components of the printing mechanisms when the arm means 2 is brought into alignment with these mechanisms.

Subsequent to the bottle-absence-sensing at station B, the turret is indexed an additional 60° increment so as to bring the bottle to first printing station C. At this station the bottle is moved by the arm means 2 through one arcuate direction. During this arcuate bottle movement, the surface $a$ is moved in indicia-forming contact with a printing screen of the printing mechanism 4 disposed at the printing station C and moves through a cylindrical path in substantial coincidence with itself.

At station C, the bottle-supporting arm 2 is engaged by an arm-driving mechanism 3, with the mechanism 3 effecting the swinging or pivotable movement of the bottle-supporting arm 2 so as to accomplish the arcuate bottle movement. At the completion of the printing of the surface $a$, arm-driving mechanism 3 is disengaged from the bottle-supporting, arm means 2. Thereafter, turret assembly 1 is indexed an additional 60° increment so as to bring the bottle into radial alignment with the position changing station D.

At station D, the outer bottle end $d$ is engaged by bottle rotating mechanism 5. Mechanism 5 rotates the bottle about its central axis $z$ so as to position the second surface $b$ in position to receive indicia. In this position the surface $b$ faces upwardly with its axis of curvature $y$ aligned with the pivot axis of the arm means 2.

After the bottle has been positioned for printing on surface $b$, turret assembly 1 is indexed an additional 60° increment so as to position the bottle in radial alignment with the second printing station E. At station E, the arm means 2 is engaged by another arm-driving mechanism 3 and rotated about its pivot axis in a direction opposite to that in which it was rotated at first printing station C so as to carry the bottle with the surface $b$ moving in tangential indicia-forming contact with a printing screen carried by the printing mechanism 4 at station E. During this movement, the surface $b$ moves through a cylindrical path in substantial coincidence with itself.

After the surface $b$ has been printed, the turret is again indexed 60° so as to bring the bottle to the unloading station F. At station F the bottle, which has now been printed on both surfaces $a$ and $b$, is withdrawn generally radially from the turret 1. This withdrawal may be accomplished automatically by an unloading, pivoted arm-like device such as that described in the aforesaid Berthold et al. disclosure.

Bottle transporting means

FIGURES 1, 2, 6 and 7 illustrate structural details of bottle transporting means including a turret plate and a movable pin control mechanism employed to prevent the operation of components of the printing mechanisms 4 at stations C and E in response to the absence of bottles on the arm means 32.

The article-transporting means of the apparatus shown in FIGURE 1 includes turret means comprising a turret plate 101. Turret plate 101 is connected to an upper, annular hub 102 by threaded fasteners 103. Hub 102 is journaled on a central, axially reciprocable, but rotatably immovable shaft 104 by ball bearing assemblies 105 and 106. As illustrated, bearing assemblies 105 and 106 may be spaced by an annular sleeve 107. These bearing and sleeve components may be secured in place by a retaining nut 108 with the space above bearing assembly 105 being enclosed by a central cap 109.

Central shaft 104 serves to effect axial reciprocation of turret plate 101. This reciprocation is effected by a central shaft carried cam follower 110 which is engaged by a cam track 111 of a cam disc 112. Cam 112 is connected to a horizontal drive shaft 113. Drive shaft 113 may extend to a conventional, drive mechanism, not shown, which serves to drive the various components of the apparatus shown in FIGURE 1 in properly timed relationship.

Rotation of turret plate 101 about the axis of turret rotation, i.e. the vertical axis of shaft 104 may be effected by a drive chain including a bevel gear 114 supported on a drive shaft 115 which may extend to a conventional, intermittent drive mechanism, not shown, which is operated by the main drive mechanism of the overall apparatus. Bevel gear 114 is meshingly engaged with another bevel gear 116 which in turn is connected with annular, gear hub 116a. Hub 116a is journaled on a stationary supporting sleeve 117 which in turn extends to supporting framework, not shown. Bearing means, such as the schematically shown roller bearing assembly 118, capped by a bearing capping plate 119, serve to mount the hub 116a on the sleeve 117 for rotation relative to this sleeve. Hub 116a is supported against vertically downward movement by a conventional roller-type, thrust bearing assembly 120 which is mounted on a frame portion 121.

Stabilized, vertical reciprocating movement of shaft 104 through stationary mounting sleeve 117 may be facilitated by means such as friction-reducing and shaft-supporting bushing 122. Shaft 104 may be splined to a frame portion, in a conventional manner not shown, to prevent its rotation.

A pin plate 123 is connected to hub 116a by threaded fasteners 124 for joint rotary movement therewith. A plurality of brackets 125 are connected by threaded fasteners 126 to plate 123. Each bracket 125 carries a vertically extending, short rod 127.

A connecting plate 128 is connected to upper hub 102 by threaded fasteners 129. Connecting plate 128 is provided with a plurality of slide bushings 130, each of which slidably embraces a rod 127.

With the arrangement heretofore described, rotation of drive shaft 115 serves to transfer rotary motion through inter-gears 114 and 116 to annular hub 116a. Rotation of hub 116a is transferred to pin plate 123 and through rods 127 to the connecting plate 128. Rotary movement of plate 128 in turn induces rotary movement of upper hub 102 and thus turret plate 101. The vertically slidable connection between connecting plate 128 and the rods 127 permits vertical reciprocation of the turret plate 101 to be accomplished without interferring with the drive chain which imparts rotary movement to the turret plate 101 and without effecting reciprocation of the vertically immovable pin plate 123.

Cam track 111 is configured in relation to the intermittent drive associated with shaft 115 so as to impart the desired pattern of intermittent axial reciprocation and intermittent rotary movement to the turret plate 101.

The sequence of intermittent rotary movement and intermittent axial reciprocation of the turret plate 101 corresponds in general to the sequence of movements of the turret mechanism described in the aforesaid Berthold et al. disclosure. These movements are such as to cause the turret plate 101 to be vertically elevated toward a printing mechanism to such a height as to enable bottles carried by arm means 2 to be moved in tangential indicia forming contact with printing screens, with the turret plate remaining stationary, i.e. dwelling, during the bottle and screen contact interval. At the completion of the printing interval, the turret plate 101 may be withdrawn downwardly and intermittent rotary movement imparted to the plate so as to advance the plate a 60° increment to transfer bottles from one working station to another.

Pin plate 123 carries a plurality of vertically reciprocable control pins 131, each of which pins is associated with an individual arm means 2 carried by the turret plate 101. Thus, with the arrangement illustrated in FIGURE 1 wherein the plate 101 supports six arm means 2 symmetrically disposed about the periphery of the plate 101 at 60° increments, the pin plate 123 supports six control pins 131 similarly symmetrically spaced at 60° increments about the pin plate 123. However, each pin is disposed so as to follow behind its related printing station. Thus, the control pin 124a associated with the arm means 2 at loading station A is spaced a counterclockwise increment from this arm means, when the printing apparatus is viewed as shown in FIGURE 1.

As shown in FIGURE 7, each control pin 131 may include two annular grooves 131a and 131b. Each pin 31 may also be disposed within a bushing 132 carried by the pin plate 123. A coil spring 133 is provided in association with each pin 131 to urge a detent 134 generally radially toward itself. As illustrated, each detent 134 passes through a bushing aperture 132a so as to physically engage the outer periphery of the pin 131. In the position of the pin 131 shown in FIGURE 7, the detent 134 is in engagement with the lower groove 131b so as to tend to retain the pin 131 in its uppermost or original position. When the pin 131 is moved axially downwardly, the detent 134 engages the upper pin groove 131a so as to tend to secure the pin 131 in its lowermost or a control position.

FIGURE 7 schematically illustrates a hammer mechanism 135 which may be employed to effect the downward movement of the pins 131. As illustrated in FIGURE 1, mechanism 135 is disposed intermediate loading station A and scanning station B and adjacent the periphery of pin plate 123.

Hammer mechanism 135 includes a cylinder 136 which is supported on a horizontal pivot joint 137. Pivot joint 137 is connected to a mounting bracket 138 which in turn extends from a base 139. A piston rod 140 extends from a fluid actuated piston contained within the cylinder 136. Piston rod 140 is connected by pivot pin 141 to a crank 142. Crank 142, which is pivoted at pivot joint 143, includes a pin hammering, end portion 144. Crank portion 144 may be provided with a pin upper end engaging knob 145.

The operation of hammer mechanism 135 is effected in response to the determination of the absence of a bottle on an arm means 2 at station B by a conventional photo-electric sensing mechanism 146. As illustrated in FIGURE 6, this mechanism may include a photo-electric sensing cell 147 and a light source 148. Light source 148 is arranged relative to sensing cell 147 such that the presence of a bottle on an arm means 2 at the station B will interrupt the path of light from the source 148 which normally would impinge upon the cell 147. When a bottle is absent on the arm means at the station B, the cell 147 will generate a control signal, and through conventional control circuitry, not shown, supply pressurized fluid to the cylinder 136 to effect the actuation of the hammer mechanism 135. This actuation will result in downward movement of the crank arm end portion 144 so as to cause the depression or downward movement of a pin 131 carried on the pin plate 123 and aligned with the hammer mechanism 135.

As will be appreciated, with this control arrangement, the sensing circuit involving the photocell 147 will be operable to effect the operation of the hammer mechanism 135 only while the turret mechanism is at rest between periods of intermittent rotary movement.

As illustrated in FIGURE 1, the control pin 124c associated with the arm means 2 at printing station C will have moved past a conventional microswitch 149 associated with the printing mechanism 4 at station C. A switch-actuating projection 150 extends beneath the pin plate 123 so as to be engageable with pins 131 which have been depressed into their lowermost positions. Thus, a pin 131 depressed by hammer mechanism 135 will actuate the conventional control switch 149 while the arm means 2 associated with this control pin 131 moves from station B to the first printing station C. In the event that actuation of switch 149 should occur in response to the absence of a bottle on the arm means 2, as detected at sensing station B, a control signal will be generated by the switch 149 and transmitted to the printing mechanism 4 at station C. This control signal may be employed, for example, to prevent the lowering of a squeegee into printing actuating engagement with a printing screen or to otherwise affect the operation of the printing mechanism at station C so as to prevent the performing of printing steps at this station.

When an arm means 2, lacking a bottle, moves from station D to second printing station E, its depressed control pin 131 will trip and actuate a second, conventional control micro-switch 151 associated with the second printing mechanism 4 at printing station E. The engagement of this pin 131 with a switch-actuating projection 152 may serve to prevent the depression of an ink-distributing squeegee at printing station E into engagement with a printing screen at this station.

Each control pin 131 which has been depressed or moved downwardly in response to a no-bottle condition, is restored to its uppermost original position by a pin restoring wedge 153 as shown in FIGURE 2. Restoring wedge 153 may be disposed on frame portion 121 in the general vicinity of loading station A as shown in FIGURE 1. In this manner, it is insured that all depressed pins 131 are automatically raised to their inoperative positions for the beginning of each printing cycle.

*Turret-carried arm means*

A plurality of article-engaging arm means 2 are mounted on the upper surface of turret plate 101. As previously noted, in the embodiment shown in FIGURE 1, six such arm means 2 are symmetrically arranged on plate 101 and spaced at 60° increments with reference to the axis of rotation of turret plate 101.

Structural details of a representative arm means 2 are illustrated in FIGURES 3, 4 and 5.

Each arm means 2 includes a pivot housing 201 within which a pivot shaft 202 is rotatably journaled. The axis of shaft 202 extends horizontally and radially of the axis of rotation of the turret plate 101. Each housing 201 is secured to the turret plate 101 by conventional fastening means, not shown.

Pivot shaft 202 is journaled within housing 201 by ball bearing assemblies 203 and 204 which are appropriately spaced by sleeves 205 and 206.

Means are provided to insure the desired alignment of the pivot shaft 202 during various phases of the printing operation. This alignment means includes an abutment plate 207 which is connected to pivot shaft 202 by a conventional key 208 and secured by a threaded fastener means 209 which threadedly extends into an end of the shaft 202.

As shown in FIGURE 4, the end of the housing 201 facing the axis of rotation of the turret plate 101 is provided with a plurality of stop-pin-receiving holes 210. These holes are disposed on each side of an abutment defining, lug portion 211 of the plate 207. Stop pins 212 are threadably disposed in holes 210 so as to define the desired limits of oscillation of the pivot shaft 202 in accordance with the dimensions of a bottle to be printed. The extent of oscillation of the pivot shaft 202 is limited by engagement of the abutment lug 211 with symmetrically paired stop pins 212 disposed on either side of the abutment 211. As illustrated in FIGURE 4, pins 212 have been inserted into upper symmetrically paired holes 210 so as to obtain a minimum extent of oscillation of the pivot shaft 202. An additional extent of oscillation could be provided by placing the abutment pins 212 in lower holes 210 illustrated in FIGURE 4.

An overcenter-type of biasing mechanism may be associated with the abutment plate 207. This overcenter mechanism includes a coil-type tensioning spring 213 having one end 213a connected to a pin 214 mounted on the abutment lug 211. The other end 213b of the tensioning spring 213 is connected to an anchor pin 215 which is secured to a lower portion of the housing 201.

As shown, pins 214 and 215 are threadably secured with the abutment lug 211 and housing 201 respectively. These pins are so disposed that the tension spring 213 extends from the upper side of the shaft 202 to the lower side of the shaft 202. The anchor pin 215, as shown in FIGURE 4, is aligned with a median plane extending vertically through the axis of the pivot shaft 202, which median plane is spaced from the stop pins 212 disposed on either side of the abutment lug 211.

As will be appreciated, this overcenter arrangement will tend to resiliently hold the pivot shaft 202 against the stop pins 212 and urge the shaft 202 toward these stop pins near the ends of the pivotal movements of the shaft 202.

A braking mechanism may also be provided on each arm means 2 for positively preventing movement of the arm means pivot shaft 202 while the turret plate 101 is rotating between work stations.

Each braking mechanism includes a generally cylindrical housing portion 216 which is connected to the base of a pivot housing 201 and extends downwardly through an aperture 101a of the turret plate 101. A brake pin 217 is mounted for vertical reciprocating movement within a cavity 216a formed in the housing portion 216. A coil spring 218 engages a pin shoulder 217a so as to tend to bias the pin 217 upwardly. Upward movement of the pin 217, as well as rotation of this pin, is limited by a small pin 219 which is connected to the housing portion 216 and extends transversely through a vertically elongate slot 217b formed in the pin 217.

The upper end 217c of brake pin 217 is tapered so as to have a generally chisel-like configuration. This configuration facilitates the engagement of the pin 217 with appropriate notches 220 formed on the periphery of the lower side of the abutment plate 207. As shown in FIGURE 4, notches 220 are disposed so that a notch is vertically aligned with the chisel tooth end 217c of brake pin 217 for each position of the abutment plate 207 defined by engagement of the abutment lug 211 with a stop pin 212 disposed in one of the various holes 210.

Vertically downward movement of the brake pin 217, out of locking cooperation with the abutment plate 207 and the pivot shaft 202, is effected by holding plates 221 which are mounted beneath the turret plate 101 at each printing station C and E. These plates 221, which are rigidly mounted on frame portions 222, are disposed such that a roller-type abutment 223 carried by the lower end of a brake pin 217 is moved beneath a holding plate 221 when an arm means 2 is aligned with the printing station C or the printing station E. When the turret plate 101 is elevated with an arm means 2 thus disposed so as to effect a printing of an article surface, the notches 220 are lifted out of engagement with the pin end 217c so as to allow the desired rotation of the pivot shaft 202.

No holding plate 221 is provided at bottle-loading station A, scanning station B, bottle-rotating station D, or bottle take-out station F. Thus, at these stations, the pivot shafts 202 remain positively secured by their associated brake pins 217.

Each pivot shaft 202 of each arm means 2 supports an arm assembly including a bottle-neck engaging mechanism which is adjustable radially of the pivot axis of the shaft 202 and which may be pivotably adjusted in a planar direction common to the radial axis of the arm assembly and its pivot axis.

Each arm assembly includes a bracket 224 which is rigidly connected to a pivot shaft, enlarged end portion 202a by conventional fastening means, not shown. Bracket 224 includes a passageway 224a within which an arm 225 is slidably disposed. Arm 225, which has a generally C-shaped cross section, is disposed within the passage 224a such that its longitudinal, i.e. radial, axis is coplanar with the pivot axis of the shaft 202.

A threaded adjusting rod 226 is journaled in arm 225 and threadably intersects and engages a lug portion 224b which is contained within the passage 224a and projects into the open side of the arm 225. With this conventional, threaded rod adjusting arrangement, rotation of the end 226a of the adjusting rod 226 will tend to move the arm 225 radially of the pivot shaft 202. In this manner, a bottle-neck engaging mechanism 227 carried on the upper end of an arm 225 may be positioned so that an arm-carried bottle is spaced from the arm means pivot axis with a surface curvature axis coincident with this pivot axis.

Mechanism 227 includes a housing portion 228 which is connected by a pivot shaft 229 to spaced web portions 225a and 225b formed on the upper end of each arm 225 as shown in FIGURES 3 and 15. Pivot shaft 229 is perpendicular to a plane common to the pivot axis of shaft 202 and the longitudinal axis of arm 225 which extends radially of this pivot axis.

Each article-engaging mechanism 227 is provided with cylinder means 230 defined by a cylinder sleeve 230a and cylinder heads 230b and 230c. Cylinder head 230c is connected to housing 228 and includes an axial aperture 230d which is lined with a friction-reducing bushing 231. A piston 232, slidably mounted within the interior of cylinder sleeve 230a, is provided with a piston rod 233 which extends axially through the bushing 231 and housing 228 to terminate on the housing exterior, as shown. The outer end of piston rod 233 is provided with an enlarged nose 234 which includes a generally frustoconical camming surface 234a generally facing the cylinder head 230c and a frustoconical, bottle neck entering surface 234b.

A pressurized air inlet 235 is provided adjacent cylinder head 230b so as to supply pressurized air to the interior of sleeve 230a on one side of piston 232 and thus tend to move the piston rod 233 to the right when the bottle-engaging mechanism 227 is viewed as shown in FIGURE 5.

As shown in FIGURE 3, an air passage defining member 236 may be connected to the exterior of the cylinder means 230 and provide a pressurized air inlet 237 communicating with the interior of the cylinder sleeve 230a adjacent cylinder head 230c. Pressurized air supplied through this passage will tend to move the piston 232 to the left when the mechanism 227 is viewed as shown in FIGURE 5. Conventional, flexible air conduits, not shown, may be connected to passages 235 and an inlet 238 of member 236 so as to supply pressurized air from an appropriate and conventional source, not shown, under the influence of conventional control mechanisms, also not shown.

A plurality of bottle-neck-interior-engaging fingers 239 are connected by pivot pins 240 to the housing 228 so as to peripherally encircle and lie generally adjacent end portion 233a of the piston rod 233 which extends between the end of the housing 228 and the camming surface 234a and be pivotable in planes extending radially of the rod 233. In the preferred embodiment, it is contemplated that three such pivoted fingers 239 will be provided. A mounting ring 241 disposed within the housing 228 supports a plurality of leaf springs 242. Each of these springs engages a lever portion 239a of a finger 239 so as to tend to resiliently bias a generally rod-like finger portion 239b radially toward the axis of the piston rod 233 and into engagement with the periphery of piston rod portion 233a.

With this arrangement, when pressurized fluid is introduced through passage 237, and the piston 232 is moved to the left as shown in FIGURE 5, frustoconical camming surface 234a engages the finger portions 239b so as to tend to pivot them radially and outwardly away from the axis of the piston rod 233 such that they assume a diverging position shown in FIGURE 3.

Each bottle-neck-engaging mechanism 227 will assume the arrangement of components shown in FIGURE 5 while at the bottle-loading station A. At this station an individual bottle may be moved axially over the piston rod 233, the loading nose 234, and the collapsed fingers 239. As shown in FIGURE 5 the frustoconical cam surface 234a is diametered so as to substantially shield the ends of the fingers 239 so as to facilitate the axial entry of the piston rod and fingers into the interior of the bottle neck. After the bottle neck has been moved onto the piston rod 233 and the fingers 239, pressurized air may be introduced into the inlet 237 so as to move the camming surface 234a to the left to cammingly engage and expand the fingers 239 into gripping engagement with a bottle neck interior at the loading station A.

As shown in FIGURE 3, the inclined fingers 239 may engage the junction of a bottle neck and bottle body portion so as to cammingly urge the bottle neck lip toward and into engagement with a frustoconical face 228a, which face is coaxial with piston rod 233. In some instances it may suffice for the ends of the fingers 239 to merely frictionally engage the cylindrical interior of bottle neck.

When each arm means 2 arrives at the bottle-rotating station D and at the bottle-unloading station F, the supply of pressurized air to the inlet 237 may be interrupted and pressurized air then supplied to the inlet 235. This reversal of pressure on the piston 232 will tend to cause the cam surface 234a to move to the right so as to allow the fingers 239 to collapse toward the piston rod portion 233a under the biasing influence of the spring fingers 242. With the fingers 239 thus released from their gripping engagement with the interior of a bottle neck, the printed bottles may be rotated at the station D and axially withdrawn from the piston rod 233 at the station F.

As a conventional practice, it is often desirable to supply pressurized air to the interior of flexible walled bottles during a printing operation so as to support these walls while they are receiving indicia. Thus, a conduit 243, extending from a conventional source of pressurized air not shown, may be connected with a housing passage 228b which communicates with an annular space 228c encircling an intermediate portion of piston rod 233. An aperture 228d, through which the piston rod 233 projects, is so dimensioned as to provide for the flow of pressurized air from the annular space 228c outwardly of the housing 228 and around the periphery of the piston rod portion 233a into the interior of a bottle. With this arrangement some air will leak out of the annular cavity 228c to the exterior of a bottle. Such leakage, however, in practice has been found to not unduly adversely affect the pressurization of the bottle interior, possibly, to some extent, due to the tendency of the expanded figures 239 to hold a bottle neck lip flush against surface 228a.

As will be appreciated, the cyclic flow of pressurized air into the space 228c for ultimate flow into a bottle interior may be controlled by conventional mechanisms, not shown.

Where arcuate bottle surfaces to receive indicia have axes of curvature which are inclined with respect to a central bottle axis, it is necessary that the bottle be supported on the bottle-engaging mechanism 227 with its central axis inclined with, but coplanar with respect to, the pivot axis of the shaft 202. This inclination is necessary to position the curvature axis of an arcuate bottle surface to be printed in axial alignment with the pivot axis of a shaft 202. In order to enable the bottle-engaging mechanism 227 to be adapted to a variety of bottle configurations, the housing 228 is pivotable about pin 229 in a planar direction common to the radial axis of its arm 225 and the pivot axis of its pivot shaft 202.

The desired position of inclination of each housing 228, relative to its associated mounting plates 225a and 225b, so as to enable the axial alignment of a piston rod 233 with a bottle central axis may be secured by a conventional threaded fastener, clamping arrangement. Thus, a threaded fastener 244 may extend from a transverse, threaded passage 228e of housing 227 and intersect arcuate slot means such as the slot 225c formed on the plate 225a. With this arrangement, as the housing 228 is pivoted about the pivot pin 229, the threaded fastener 244 will move through the plate slot 225c. After a desired position of inclination has been attained, the threaded fastener may be clamped against the plates 225a so as to secure the housing 228 with the piston rod 233 disposed in a proper position of alignment relative to the arm 225.

Each arm assembly is provided with socket means 245 which is adapted to be engaged by an arm driving means 3 so as to effect pivotable movement of its arm 225 about the pivot axis of the shaft 202.

As shown in FIGURES 3 and 10, each socket means 245 comprises a pair of laterally spaced bearing assemblies 246. Each such assembly may include a roller bearing 247 which is conventionally journaled on a stub shaft 248. Each shaft 248 may be secured to a mounting bracket 249 by a threaded fastener 250. The axis of rotation of the two spaced roller bearings 247 are mutually parallel, disposed in a plane perpendicular to the pivot axis of shaft 202, and parallel to the radial axis of arm 225.

The two bearings 247 define a socket-like opening between their mutually facing cylindrical peripheries. This socket is generally symmetrically aligned with the longitudinal or radial axis of the arm 225 and diverges outwardly, away from the arm 225.

*Arm driving means*

An arm driving means 3 is disposed at first printing station C as well as at second printing station E. The arm driving means 3 at each of these printing stations are substantially identically configured. Each arm driving means 3 is adapted to engage and pivot the arms 225 of each arm means 2 when each arm means is aligned at its respective printing station so as to move a bottle carried by the arm means in printing contact with a screen printing means 4.

Arm driving means 3 at stations C and E may be connected to a common drive mechanism so as to facilitate the pivoting of the arms 225 of arm means at each of these printing stations in unison, but in opposite directions. In being so manipulated, the arm means at stations C and E move together in a generally mirror-image or symmetrical relationship with respect to a median plane extending through the axis of rotation of the turret plate 101 and intersecting the loading station A and bottle-rotating station D.

Structural details of a representative arm driving means 3 are illustrated in FIGURES 8, 9 and 10.

Each arm driving means 3 includes arm engaging means which comprise a cylindrical sleeve 301, an arm-like assembly 302 adapted to engage a bottle end *d*, and a generally L-shaped member 303.

Sleeve 301 is slidably supported in bushings 304 and 305 so as to be disposed for reciprocation in axial alignment with the pivot axis of pivot shaft 202 of each arm means 2 when it is stationary and positioned at either the printing station C or the printing station E. Bushings 304 and 305 are mounted within a housing 306, which housing is journaled for rotation within frame brackets 307 and 308 by ball bearing assemblies 309 and 310, as shown in FIGURE 8. Bearing assemblies 309 and 310 may be secured in position by bearing caps 311 and 312, respectively, as shown in FIGURE 8.

L-shaped member 303 includes one leg portion 303*a* which is rigidly clamped to the outer periphery of sleeve 301 and projects perpendicularly outwardly, as schematically shown. Another leg portion 303*b* is spaced from the sleeve 301 and projects generally parallel with the sleeve 301 and toward the arm means carrying turret assembly.

An axially adjustable abutment member 313 is carried on the outermost end of leg 303*b*. Abutment 313 is adapted to be received within the socket defined between the two bearing members 247 of each arm means 2 as shown in FIGURE 11. As shown in FIGURE 11, each abutment 313 is provided with a longitudinal slot 313*a* through which a threaded clamping member 314 transversely projects. Clamping member 314 is threadably engaged with the outer end of leg 303*b*.

An axially movable, adjusting rod 315 is threadably mounted within a portion of the leg 303*b* so as to extend axially toward and engage the left end of the abutment 313 as shown in FIGURE 11. With the clamp 314 loosened the threaded rod 315 may be rotated so as to define a position of extension of the abutment 313 which will enable it to be properly received between the bearings 247 of each socket 245. As will be appreciated, when a proper position of extension of the abutment 313 has been obtained through manipulation of the adjusting rod 315, the clamp 314 may be tightened so as to secure the abutment 313 in its proper position.

As shown in FIGURE 11, the spacing between the bearings 247 of each arm means 2 is such that the periphery of these bearings engage opposing sides of the fully received abutment 313 while allowing axially slidable movement of the abutment 313 in contact with these bearing members. As will be apparent, L-shaped member 303 is so dimensioned as to cause the abutment 313 to be projectable between the bearing members 247 when an arm means 2 and an arm driving means 3 are oriented for mutual engagement.

An adjusting sleeve 316 is journaled within reciprocable sleeve 301 and is provided with a turning knob 317. Knob 317 may be connected to adjusting sleeve 316 by a conventional key 318. A threaded rod 319 is threadably engaged with the interior of adjusting sleeve 316 and projects toward the turret assembly through a yoke 320. Rod 319 is journaled within yoke 320 by a conventional ball bearing assembly 321 and is rigidly connected with arm assembly 302. As schematically shown in FIGURE 8, arm assembly 302 includes an apertured portion 302*a* by means of which it is slidably connected to leg portion 303*b* of L-shaped members 303. An arm-assembly-carried, clamping screw 322 may be provided to clamp the arm assembly 302 to the leg portion 303*b*.

By rotating knob 317, the threaded rod 319, which is rigidly connected with the arm assembly 302 and thus restrained against rotation, is moved axially of the sleeve 301 in a direction depending upon the direction of rotation of the handle 317. With this arrangement the arm assembly 302 may be adjusted axially with respect to the axis of rotation of a turret assembly so as to effect the proper engagement of the arm assembly 302 with an end *d* of a bottle to be printed, depending upon the length of this bottle. A properly adjusted position of the rod 319 may be secured by a clamping knob 323 which is threadably mounted on the end of the adjusting sleeve 316 for clamping engagement with the adjusting knob 317 as schematically shown in FIGURE 8.

Arm assembly 302 is radially adjustable with respect to the axis of the sleeve 316 so as to accommodate bottles having different axes of curvature lengths and enable these bottles to be properly supported with their axes of curvature coaxially aligned with the aligned pivot axes of pivot shafts 202 and sleeves 301. Thus, each arm assembly 302 includes a bracket member 324 which is rigidly engaged with the projectable end of the rod 319 and a radially adjustable arm member 325.

Each arm 325 is slidably mounted in its respective bracket 324 in a manner akin to the mounting arrangement of the arm 225 in its bracket 224.

A threaded adjusting rod 326, offset from the leg portion 303*b* receiving passage of arm assembly portion 302*a*, effects the radial adjustment of the arm 325 on the bracket 324 in a manner similar to that in which an adjusting rod 226 effects the radial adjustment of its associated arm 225. A bottle end engaging shoe 327, shown in phantom line in FIGURE 8, may be provided for engaging and securing a bottle end *d*. As illustrated, shoe 327 is mounted upon the upper end of the arm 325.

Shoe 327 includes an outwardly diverging, bottle end receiving, socket 327*a*. Socket 327*a* may be tailored to the configuration of an individual bottle end so as to conformingly engage this bottle portion. Such a socket configuration will cammingly engage a bottle end, when the shoe is moved into engagement with it, to positively insure proper alignment of a bottle supported between the shoe 327 and an arm means mechanism 227. If a bottle supported by fingers 239 of the mechanism 227 should be slightly out of its desired rotary alignment, the shoe 325, in engaging the bottle end, will cam this end into conforming alignment by overcoming the friction grip of the fingers 239 and partially rotating the bottle about its central axis z.

As schematically shown, the shoe 327 may be pivotally adjustable upon the upper end of arm 325 so that, when fully engaged with a bottle end d, it may be coaxially aligned with the bottle central axis z and the central axis of piston rod 233 of a mechanism 227. Thus, the shoe 327 may be connected by a pivot pin 327b to arm 325, which pivot pin has an axis perpendicular to a plane common to the pivot axis of sleeve 301 and the radial axis of the arm 325. A conventional, threaded clamping screw 327c carried by the arm 325 may clampingly engage a correctly inclined bracket 327d which supports the shoe 327, as schematically shown in FIGURES 8 and 10.

Yoke 320, which is journaled to rod 319 and connected with this rod for unitary reciprocating movement, is slidably supported upon horizontal rails 328 and 329 which are in turn supported on framing brackets 308 and 330. As shown in FIGURES 8 and 10, bracket 308 is provided with an aperture 308a through which leg portion 303b projects while bracket 330 is concave between rails 328 and 329 so as to pass below the leg portion 303b. This configuration of the brackets 308 and 330 enables the L-shaped member 303 to undergo pivotable movement in unison with the pivotable movement of the sleeve 301 to which it is connected.

As illustrated, rails 328 and 329 are arranged in parallel alignment with the axis of reciprocation of the sleeve 301.

Alternating rotary movement is imparted to housing 306 by a gear 331 which is rigidly mounted on the housing 306 in coaxial relationship with the sleeve 301. Such oscillating movement of the gear 331 is transmitted from housing 306 through a connecting pin 303c to the L-shaped member 303. As shown, pin 303c extends as a rigid projection from leg portion 303a generally parallel to sleeve 301 into a bushing 306a carried by the housing 306. As will be apparent, oscillating movement of the member 303 is transferred to the arm assembly 302 primarily through the connection of the leg portion 303b and the bracket 324.

Gear 331 is meshingly engaged by a toothed rack 332. Toothed rack 332 is supported on a horizontally reciprocable drive bar 333 for horizontal reciprocating movement in a direction tangential to the periphery of gear 331. Reciprocable drive bar 333 is slidably mounted for horizontal reciprocating movement in apertured, frame bracket portions 307a and 307b as shown in FIGURES 8 and 10. Drive bar 333 is prevented from rotating by a stabilizing arm 334. This arm is connected to the lower side of the drive bar 333 and carries on its lower end a plate 335 supporting guide bearings 336 and 337. These bearings slidably engage opposite sides of a stabilizer plate 338. As illustrated, stabilizer plate 338 is affixed to bracket 307 by conventional threaded fastening means 339.

Coordinated oscillation and axial reciprocation of sleeve 301, and thus arm assembly 302, and abutment 313, is effected by a unique and particularly compact drive mechanism 340 illustrated in FIGURES 8, 10, 12 and 15.

Drive mechanism 340 includes a drive shaft 341 which has a vertical axis of rotation and which is drivingly connected with a conventional drive mechanism, not shown. As illustrated, the axis of rotation of drive shaft 341 is coplanar with the perpendicular to the axis of drive bar 333 and thus is perpendicular to the axis of reciprocation of the toothed rack 332. A cam disc 342 is connected to drive shaft 341 for unitary, rotary movement therewith. A partially arcuate and partially undulating cam track 343 is formed on the upper surface of cam disc 342 as shown in FIGURE 10.

A crank arm 344 is rigidly connected to drive shaft 341 and radially adjustably supports, at its outer end, a conventional swivel connection 345 having a vertical swivel axis parallel to the axis of rotation of drive shaft 341.

Swivel or pivot connection 345 includes a base portion 345a and a top portion 345b pivotably interconnected by a swivel shaft 345c. Base portion 345a is apertured so as to be slidably, and thus radially adjustably, mounted on crank arm 344. Base portion 345a may be secured at a desired position of adjustment on crank arm 344 by conventional means such as the schematically shown, threaded clamping screw 346.

A triple roller bearing, connector assembly 347 is mounted on the upper end of swivel joint 345. Assembly 347 includes the top portion 345b of swivel joint 345 and a top plate 348, between which are conventionally, axle-mounted or journaled three roller bearings 349, 350 and 351, each of which has a vertical axis of rotation. As illustrated in FIGURE 10, the axis of rotation of bearing 351 is disposed in alignment with a vertical median plane extending between the axes of rotation of the roller bearings 349 and 350.

A generally C-shaped yoke 352 is connected on the outer end of drive bar 333 and supports a horizontal bar 353 having a longitudinal axis extending perpendicular to the axis of the drive bar 333.

As shown in FIGURE 10, roller bearing 351 engages one side of bar 353 while roller bearings 350 and 349 engage the opposite side of this bar. With this arrangement, rotation of the shaft 341 imparts axially reciprocating movement to the drive bar 333, with the roller bearings 349, 350 and 351 remaining in rolling and sliding stabilizing contact with the bar 353. This reciprocating movement of the drive bar 333 imparts alternately opposite, pivotable, movement, i.e. continuous oscillating movement, to the sleeve 301, arm assembly 320, L-shaped member 303, and abutment 313 through the meshing inter-engagement of the toothed rack 332 and the gear 331. The extremities of arcuate or swinging movement of arm assembly 302 and abutment 313 may be varied by selectively adjusting the position of swivel joint 345 on crank arm 344.

Reciprocating movement of the sleeve 301, arm assembly 302, L-shaped member 303, and abutment 313 is effected by pivotable lever means 354 which interconnects the sleeve 301 and the cam track 343.

Pivotable lever means 354 includes a vertical pivot shaft 355 which is journaled within a sleeve-like portion 307c of frame bracket 307.

Lever means 354 also includes a first lever arm 356 which is rigidly keyed with the pivot shaft 355. A cam follower 357 supported on the lower side of lever arm 356 projects into cam track 343. A second lever arm 358, also rigidly keyed with pivot shaft 355, is provided at its outer end with a yoke portion 358a.

A connecting collar 359 is journaled on sleeve 301 for unitary axial movement therewith by a conventional ball bearing assembly 360 as shown in FIGURE 8. Connecting pins 361 and 362 are threadably connected to collar 359, with their aligned axes extending vertically and intersecting the axis of sleeve 301. Pins 361 and 362 extend through elongate slots in the yoke portion 358a so as to drivingly connect the lever arm 358 with the collar 359. Each such slot, like the slot 358b shown in FIGURE 10, is elongate in a direction extending generally longitudinally of the arm 358.

With the arrangement described, axial reciprocation of the collar 359, induced by alternate pivotable movement of the lever arm 358, transmits reciprocating movement to the sleeve 301, arm assembly 302 and abutment 313 through the interconnecting bearing assembly 360. Bearing assembly 360 enables sleeve 301 to undergo rotary oscillating movement relative to the connecting collar 359.

The pivotable movement of lever arm 358 which causes reciprocation of the sleeve 301 is induced by pivotable movement of the supporting shaft 355. Pivotable movement of the shaft 355 results from the camming influence of cam track 343 on the follower 357 carried by lever arm 356.

Cam track 343 is configured so as to cause the sleeve 301 to move toward the turret assembly and bring the abutment 313 generally axially into interlocking or coupling engagement with an arm means socket 245, simultaneously bring a shoe 327 into supporting engagement with a bottle end d, and maintain this interlocked engagement of an arm means 2 and the arm driving means 3 while arms 325 and 225 pivot together in unison to effect the printing of a bottle surface. At the conclusion of the printing of a bottle surface the sleeve 301 is moved axially away from the turret assembly so as to simultaneously disengage the abutment 313 from the socket 245 and the shoe 327 from a bottle end d and thus disconnect the arm means 2 from the arm driving means 3. A representative cam track configuration for accomplishing this pattern of reciprocation is schematically shown in FIGURE 10.

Each cam track 343 is so configured as to cause its associated abutment 313 to be projected relatively rapidly between the spaced socket bearings 247 of an arm means 2 when the arm 325 of the arm means is substantially aligned with the rest position of an arm 225 at its respective printing station, with the turret plate 101 being stationary and elevated. While this engagement occurs rapidly and involves a short increment of movement of the abutment 313, it takes place at an extremity of the pivotable movement of the arm 325 where minimal, although some arcuate movement of abutment 313 occurs. It thus will be appreciated that the outwardly opening and diverging socket opening defined by the cylindrical bearings 247 facilitates the interlocking engagement of the abutment 313 with the spaced bearings 247 while the abutment 313 is undergoing a reversal of its continuous, rotary or arcuate swinging movement of the member 303.

The withdrawal of the abutment 313 from engagement with the bearings 247 at each printing station occurs at or near the extremity of pivotable movement of the arm 325 opposite to that where engagement of the arm means 2 and arm driving means 3 occur. Here again the diverging character of the opening defined by the bearings 247 facilitates the disengagement of the abutment 313 from these bearings while some limited arcuate movement of the abutment 313 is taking place.

As will be appreciated, both engagement and disengagement of the abutment 313 with a socket means 245 occurs while the turret plate 101 is stationary and in its upper or elevated position and the axis of the sleeve 301 of the arm driving means is coaxially aligned with the pivot axis of the shaft 202 of the arm means 2 carrying the socket means. Turret 101 remains in its elevated position throughout the period of interengagement of the arm means 2 with the arm driving means 3.

In order to prevent any possibility of damage occurring to the arm means 2, it is possible for the abutment 313 to be disengaged from the socket 245 of each arm means during a short interval of arcuate movement between the termination of printing and the engagement of the arm means abutment 211 with a stop pin 212. After such disengagement has occurred, the overcenter tensioning spring 213 will induce additional pivotable movement of the arm 225 sufficient to bring the abutment 211 into engagement with an appropriate stop pin 212.

By appropriately adjusting the position of the swivel joint 345 on the crank arms 344 of the two arm driving means 3, the extremities of the swinging paths of the arm driving means, abutments 313 at stations C and E may be conformed to the extremity positions of the arm means sockets 245, as defined by the arm means stop pins 212.

The drive mechanisms 340 of each arm driving means 3 at the first printing station C and the second printing station E are arranged so as to cause the arms 225 and 325 at each station to move together in unison, but in opposite pivotable directions, in a generally symmetrical or mirror-image fashion. This relationship of movements may be insured by interconnecting the drive shafts 341 of the drive mechanisms 340 at the printing stations C and E to a common and conventional drive mechanism, not shown.

*Screen printing means*

First printing station C and second printing station E are each provided with a separate screen printing mechanism 4. Each mechanism is of the type which moves an ink permeable screen horizontally in generally tangential indicia forming contact with a cylindrically arcuate bottle side.

The screen printing mechanism 4 at printing station C is substantially identical to the screen printing mechanism 4 at second printing station E. Each of these printing mechanisms 4 is of the general type as that described in the aforesaid Berthold et al disclosure.

Major structural details of a typical screen printing mechanism 4 are schematically illustrated in FIGURES 1, 12, 13, 14, and 15.

Each printing mechanism 4 includes a frame 401 mounted for horizontal sliding movement on horizontal rails 402 and 403.

Rails 402 and 403 extend both horizontally and perpendicularly to a radius extending from the axis of rotation of the turret assembly so as to enable a printing screen to be moved horizontally in tangential engagement with a bottle supported on an arm means 2. Rails 402 and 403 are supported on rail mounting plates 404 and 405. Plate 404 is supported for selective vertical adjustment between columns 406 and 407 while plate 405 is similarly supported between columns 408 and 409. The adjusting mechanisms associated with the end plates 404 and 405, being conventional in nature, are not illustrated. Such vertical adjustments of the rails 402 and 403 enable the screen 410 to be disposed so that it will move in substantially tangential engagement with a bottle properly supported on arms 225 and 325.

Frame 401 supports a printing screen 410 aligned in a generally horizontal plane. Screen 410 may be fabricated of a variety of ink transmitting materials including silk and synthetic fabrics.

An ink distributing assembly 411 is rigidly mounted on rails 402 and 403 between the rail receiving ends 401a and 401b of the screen frame 401, as generally shown in FIGURE 1. Sufficient spacing exists between the frame ends 401b and 401a such that these frame portions do not engage the ink distributing assembly 411 during the horizontal reciprocating movement of the frame 401 hereinafter described.

Ink distributing assembly 411 includes a bracket 412 which is rigidly connected to rails 402 and 403 and which is connected by a pivot shaft 413 to a squeegee frame 414. The left end 414a of the pivotable frame 414, as shown in FIGURE 15, extends under a transverse bracket member 415 as shown in FIGURE 15.

A threaded abutment rod 416 extends through bracket member 415 to engage the top side of pivoted bracket portion 414a so as to define a desired position of pivotable adjustment of the bracket 414.

Bracket 414 supports a cylinder 417 within which is housed a pressurized fluid actuated piston. A piston rod 418 extends out of the top of cylinder 417 to a plate 419. Plate 419 is connected with guide rods 420, each of which individually projects downwardly and slidably through a tubular guide 421. These guides are carried by the bracket 414. Rods 420 extend to a squeegee supporting plate 422 disposed beneath bracket 414. A pair of threaded adjusting rods 423 extends from plate 422 and supports a squeegee frame 424. A flexible ink distributing squeegee 425 is carried by squeegee frame 424 as schematically shown in FIGURE 15.

The piston contained within the cylinder 417 is normally biased upwardly so as to tend to hold the squeegee 428 out of contact with the printing screen 410. When printing is to be accomplished, pressurized air is supplied to the interior of the cylinder 417 under the control of conventional fluid flow control means, not shown, so as to move the squeegee 428 downwardly into ink distributing contact with the screen 410. As previously noted, when a bottle is detected as not being present on an arm means 2, the squeegee 428 remains elevated while that arm means is at a printing station so as to prevent the excessive accumulation of ink on the screen 410.

While the basic components of the printing screen mechanism 4 have been described, a variety of conventional adjusting devices associated with this mechanism, which are referred to in the aforesaid Berthold et al. disclosure, have not been illustrated or described. It will be understood, of course, that such devices would ordinarily be included in a commercially employed machine.

Screen frame 401, and thus screen 410, is horizontally reciprocated along rails 402 and 403 in timed coordination with the joint and the aligned pivotal movement of the article supporting arms 225 and 325. The mechanism for accomplishing the coordinated operation of these apparatus components is basically similar to that described in the aforesaid Marquiss disclosure. This drive structure is illustrated in FIGURES 10, 12, 13 and 14.

The drive mechanism for effecting the horizontal reciprocation of the screen frame 401 includes a drive lever 426 which is adjustably clamped to a pivoted shaft 427. Shaft 427 is journaled by bearing assemblies 428 and 429 in a housing 430. As illustrated in FIGURE 14, shaft 427 is provided with a lever receiving recess 427a. A lever clamping cover plate 431 is secured by conventional threaded fasteners to housing 430 as shown so as to clamp lever 426 in place.

Lever housing 430 is mounted for selective vertical adjustment on a mounting plate 432. Mounting plate 432 is dove-tail connected to a frame portion 433 as shown in FIGURE 10. A schematically shown, threaded adjusting rod 434 is journaled in frame portion 433 and threadably engages a portion of mounting plate 432 so as to enable the selective vertical adjustment of the pivot housing 430 in a conventional fashion. A threaded clamp 435 may intersect a vertically elongate slot 433a of frame portion 433 to engage the mounting plate 432 and enable the clamping of this plate to the frame member 433.

Lever 426 is connected at its upper end, i.e. on the upper side of pivot shaft 427, through a connecting mechanism 436 to the frame 401. Another connecting mechanism 437 connects the lower end of the connecting lever 426, on the lower side of pivot shaft 427, to the left end of the drive bar 433 when the apparatus is viewed as shown in FIGURE 12.

Each connecting mechanism 436 and 437 associated with the lever 426 is substantially identical. Mechanism 437, for example, includes three roller bearings 438, 439 and 440 which are rotatably supported on axles or otherwise journaled, between plates 441 and 442. Plates 441 and 442 are connected by aligned stub axle portions to conventional ball bearing assemblies 443 and 444 which are mounted in a housing 445. With this arrangement the roller bearings 438, 439 and 440 are each rotatably supported between the plates 441 and 442 with their axes of rotation parallel to the pivot or swivel axis extending through the bearings 443 and 444. The housing 445 of connection 437 is connected to the drive rod or bar 333 as shown in FIGURE 13 while the equivalent housing of the other connection 436 is rigidly mounted on the frame 401 as shown in FIGURE 12.

In each of the connections 436 and 437, two roller bearings engage one side of the lever portion to which the connection is attached while the third roller bearing engages the opposite side of this lever portion. The axes of rotation of the three roller bearings are parallel to the sides of the pivot lever 426 and parallel to the pivot axis of the pivot shaft 427. The pivot axis of the single roller bearing 440 is aligned with a median plane extending between the paired roller bearings 438 and 439 of each of the connections 437, while a similar roller arrangement is provided in connection 436.

As will be apparent, the three roller bearings of each of the connections 436 and 437 remain in relatively slidable, i.e. rolling engagement with sides of the lever 426 while the lever 426 is undergoing its pivotable movement.

With this arrangement of the driving lever 426, reciprocating movement of the drive bar 333 effects oscillating or alternating, oppositely directed pivotable movement of lever 426 so as to induce reciprocating movement of the frame 401.

As will be appreciated, pivot shaft 427 must be disposed at such an elevation that the screen 410 is moved horizontally at a velocity equal to the arcuate velocity of a bottle surface to be printed which is being moved in tangential contact with the screen 410.

*Bottle rotating mechanism*

At bottle rotating station D a bottle engaging and rotating mechanism 5 is provided adjacent the turret mechanism 1. The function of mechanism 5 is to rotate a bottle 180° about its central axis $z$ after a first side $a$ has been printed so as to position the second bottle side $b$ facing upwardly. Surface $b$ is so oriented by the mechanism 5 that its axis of cylindrical curvature $y$ is aligned with the pivot axis of the pivot shaft 202 of the arm means 2 upon which it is mounted.

Structural details of the bottle rotating mechanism 5 are shown in FIGURES 16 through 20.

Each mechanism 5 includes a shoe 501 adapted to engage a bottle end $d$. Each such shoe 501 is mounted upon a support rod 502 which is journaled within a housing 503 by bushings 504 and 505. Support rod 502 is mounted in bushings 504 and 505 so as to be capable of undergoing both rotary and axial reciprocating movement.

A roller bearing assembly 506 provides a swivel connection between the support rod 502 and a piston rod 507. Piston rod 507 extends from a pressurized fluid actuated piston contained within a cylinder 508 which is mounted on the housing 503.

A shaft 509 is journaled on bearing assemblies 510 and 511 within the housing 503 with its axis parallel to the axis of shaft 502. A first gear 512 is keyed to shaft 509 and meshingly engages a second gear 513 which is keyed to shaft 502 as shown in FIGURE 18. The width of gear 512 is such that gear 513 remains in meshing engagement throughout the extent of joint reciprocation of the gear 513 with the shaft 502.

A second cylinder 514 is connected by pivot joint defining, stub axles 515 and 516 to earlike portions 517 and 518 respectively of frame 503. A piston rod 519 extends from a pressurized fluid actuated piston contained within the cylinder 514. Piston rod 519 intersects a vertically and segmentally slotted portion 512a of gear 512 and is connected to gear 512 by a pivot pin 520.

The stroke of the piston rod 519 and the ratio of diameter of the gears 512 and 513 is such that a full stroke of the rod 519 effects 180° of rotation of the shaft 502 and thus the article end engaging shoe 501.

As will be appreciated, the swivel connection defined by bearing assembly 506 enables rotation of the shaft 502 to occur while the piston rod 507 undergoes no such rotational movement.

When a bottle is positioned on an arm means 2 at station D, it is necessary that shoe 501 be so positioned that it may be moved axially into axially aligned engagement with an end $d$ of a bottle carried by the neck engaging fingers 239 of an arm means 2 in a generally cantilever fashion.

In order to obtain the proper positioning of the shoe 501 so as to accommodate a variety of bottle sizes and shapes, the housing 503 is mounted so as to be vertically adjustable, axially adjustable with reference to the axis of stationary mechanisms 227, and vertically pivotable through a vertical plane aligned with the central axis of a bottle supported on a mechanism 227 of an arm means 2. An additional adjustment may be made in a direction extending generally perpendicular to a radius of the turret assembly.

The vertical, pivotable adjustment of the shoe 501 is effected by pivoting the housing 503 about a pivot and mounting shaft 521. Pivot shaft 521 is mounted on a bracket 522 and pivotably supports a housing mounting plate 523. Mounting plate 523 in turn is dove-tail connected to housing 503 for generally vertical adjustment.

The desired position of inclination of the mounting plate 523 and thus the housing 503 and shoe 501 may be secured by conventional threaded clamping fasteners 524. As schematically shown in FIGURES 17 and 19, threaded fasteners 524 pass through arcuate slots 523a of dovetailed mounting plate 523 into threaded engagement with bracket 522 and are adapted to clampingly engage the mounting plate 523.

Vertical adjustments of shoe 501 are effected by a conventional threaded rod adjusting mechanism 525 which is journaled in housing 503 and threadably engages a portion of mounting plate 523.

Adjustments of shoe 501 perpendicular to a radius generally of the turret assembly are effected by a conventional threaded rod adjusting mechanism 526. Rod 526 is journaled in a base plate 527 and threadably engages a lower portion of bracket 522.

Adjustments of the bottle engaging shoe 501 generally axially of arm engaging mechanism 227 are effected by a conventional threaded rod adjusting mechanism 528. Threaded adjusting rod 528 is journaled in a stationary base portion 529 and threadably engages a lower portion 527a of base plate 527 which projects downwardly between rail like base portions 529a and 529b.

As the threaded adjusting rods 525, 526 and 528 are conventional in character and function in a manner similar to that of the adjusting rod 226, internal structural details of these adjusting devices are not illustrated.

When an article carried on an arm means 2 is positioned at bottle rotating station D, conventional control means, not shown, cause pressurized air to be introduced into cylinder 508 such that the shoe 501 is projected toward the bottle end d in generally axial alignment with the central bottle axis z. When the shoe 501 has engaged a bottle end d as shown in FIGURE 16, conventional control means, not shown, effect the supplying of pressurized air to the interior of cylinder 514 so as to cause the shaft 502 to be rotated 180° and thus rotate a shoe gripped bottle 180°. The bottle neck gripping fingers 239 may be collapsed against the rod 233 during the bottle rotation, to eliminate the frictional resistance which the fingers 239 might otherwise impose against such rotation. During the bottle rotation, the shoe 501 may hold the bottle against the frustoconical face 228a of a mechanism 227 so as to stabilize the bottle.

After the bottle has been appropriately reoriented, piston rod 507, under the influence of conventional, pressurized fluid control means, is drawn toward the cylinder 508 so as to withdraw the shoe 501 from engagement with a bottle end d. Prior to this withdrawal, the fingers 239 are again diverged into bottle interior gripping engagement.

*Apparatus manipulations during the printing of an individual bottle*

With the individual components of the overall printing apparatus having been described, the detailed sequence of component manipulations required to effect the complete printing of a single bottle will now be delineated.

In describing the directions of movement of apparatus components, it will be assumed that the viewer is positioned at the axis of rotation of the turret assembly and is facing toward the component being described.

It will be understood, of course, that the turret plate 101, in moving between individual work stations, will be lowered, rotated, and again raised. Such lowering of the turret plate insures that the arm means 2 and the bottles carried thereon will not inadvertently engage the printing mechanisms 4 during rotation of the turret plate 101. While at a work station, and while bottle printing is occurring, the turret will be in its elevated position and immovable, i.e. will undergo neither axial nor rotary movement.

In describing the sequence of apparatus manipulations with reference to FIGURE 1, it will be assumed that the turret plate 101 is rotating in a clockwise direction so as to move bottles from station A sequentially through stations B, C, D, and E to station F.

It will also be understood that the printing mechanisms, arm means and arm driving means will be appropriately adjusted to tailor these components to the dimensions and geometric properties of a bottle type to be printed. The manner in which such adjustments are accomplished have been heretofore indicated.

At station A each arm means 2 is disposed with its pivot shaft 202 rotated clockwise to its extremity as limited by a stop pin 212. The bottle neck gripper mechanism 227 of each such arm means 2 is disposed, as illustrated in FIGURE 5, with the bottle interior gripping fingers 239 held flush against the piston rod 234.

With an arm means disposed as above described, a bottle is advanced axially toward its piston rod 234 so that the end of the piston rod and the fingers 239 enter the bottle neck and the bottle lip engages the frustoconical surface 228a. The piston 232 is retracted away from the bottle so as to diverge the fingers 239 outwardly into gripping engagement with the interior of the bottle.

While at loading station A, brake pin 217 remains in locking engagement with the abutment plate 207 associated with the pivot shaft 202 of the arm means 2.

At scanning station B a bottle loaded on the arm means 2 would come to rest, when the turret is elevated and immobile, so as to intersect the light path between light source 148 and photocell 147. With the bottle interrupting this light path, no control signal is generated which would effect the pin depressing action of the hammer mechanism 135.

It will be understood, of course, that the absence of a bottle at scanning station B will result in the generation of a control signal by photocell 147 which will cause the hammer mechanism 135 to depress a control pin 131 on pin plate 123. This depressed control pin, in moving toward printing station C and toward printing station E will actuate switch mechanisms 149 and 151 respectively so as to maintain the ink distributing squeegees at each printing station out of contact with its associated printing screen.

While at station B, the brake pin 217 remains in braking cooperation with the arm means 2.

At first printing station C, the arm means 2 is disposed so as to support a bottle with its first arcuate surface a facing generally upwardly and with its axis of cylindrical curvature x coaxially aligned with the axis of rotation of the pivot shaft 202.

With the turret plate 101 in its raised or elevated position, effected through the cam induced raising of the shaft 104, the arm means 2 is engaged by the arm driving means 3 positioned at the printing station C. When this engagement occurs, the pivot axis of shaft 202 is coaxially aligned with the axis of the sleeve 301 of the means 3. The raising of turret plate 101 will release the brake pin 217 from braking cooperation with the arm means 2 at station C.

The engagement of the arm driving means 3 with the arm means 2 occurs as the continuously oscillating L-shaped member 303 is projected toward the arm means socket 245 in generally axial alignment with this socket. The arm drive means abutment 313 generally axially engages the socket 245 and, through the arcuate movement of the L-shaped member 303, induces corresponding arcuate movement of the arm 225.

When the L-shaped member 303 is projected toward the arm means 2, the bottle end engaging shoe carried by the arm 325 is moved into supporting and stabilizing engagement with a bottle end $d$ so as to tend to cammingly correct any minor bottle misalignment as heretofore described.

With the arm driving means 3 engaged with the arm means 2 and a bottle supported between the aligned arms 225 and 325 as described, the bottle is arcuately moved in a counter-clockwise direction about the pivot axis of the shaft 202 with the bottle side $a$ moving in tangential indicia forming contact with the printing screen 410 at the station C. It will be understood, of course, that during this arcuate movement of the bottle, the screen 410 will be horizontally moved as shown in FIGURE 1, generally away from the median station D. During this movement the squeegee 425 will be in its lowered position, i.e. in ink distributing contact with the screen 410.

During the printing of the bottle, the axis of cylindrical curvature $x$ of the surface $a$ will be perpendicular to the axis of rotation of the turret plate 101, with this curvature axis and axis of rotation lying in a plane perpendicular to the direction of movement of the screen 410.

After the bottle surface $a$ has been printed, the L-shaped member 303 is withdrawn away from arm means socket 245 so as to disengage the arm driving means 3 from the arm means 2. The squeegee 425 is raised for the return stroke of the screen 410, i.e. movement of the screen generally back toward median station D.

At station D the arm means 2 supporting a bottle with a printed surface $a$ is disposed with the arm 225 pivoted to its counter-clockwise extremity as determined by a stop pin 212. At this station, the brake pin 217 remains in braking cooperation with the arm means 2.

With the arm means 2 aligned as described, the bottle end engaging and bottle rotating shoe 501 is moved generally axially toward the end $d$ of the bottle and into engagement with the bottle end. The fingers 239 are collapsed, i.e. converged, and the shoe 501 is then rotated 180° so as to bring the bottle surface $b$ into a generally upwardly facing position. In this position, the axis of cylindrical curvature $y$ of the surface $b$ will have been brought into coaxial alignment with the pivot axis of the pivot shaft 202.

After the bottle has been rotated and reoriented by the mechanism 5, the fingers 239 are again diverged into bottle gripping engagement and the shoe 501 is withdrawn from the bottle end $d$.

As the shoe 501 is rotated through 180° increments, the piston rod 519 may be actuated in alternately opposite directions to effect the rotation of bottles on successive arm means in alternately opposite directions. This mode of alternately opposite reorientation would obviate the need for resetting of the shoe 501 to an initial position to receive each bottle.

At second printing station E, the arm means 2 is initially disposed with its bottle supporting arm 225 pivoted to the counter-clockwise extremity of its travel and with its surface $b$ facing upwardly to receive indicia. With the turret elevated and immobile, the axis of the pivot shaft 202 is coaxial with the axis of the sleeve 301 at the station E and the brake pin 217 is disengaged from the plate 207.

The arm driving means 3 at printing station E engages the arm means 2 and its supported bottle in a manner identical to the mode of engagement of these components at the first printing station C. Arm driving means 3 then pivots the arm 225 clockwise so that the bottle is arcuately moved in a clockwise direction about the pivot axis of the shaft 202, with the bottle surface $b$ moving in tangential indicia forming contact with the screen 410 of the printing mechanism 4 at the station E. During this printing movement, the screen 410 at the printing station E is moved horizontally generally away from the median station D. Also, during this printing movement, the axis of surface curvature $y$ is perpendicular to the axis of rotation of the turret plate 101, with these two axes being disposed in a common plane perpendicular to the direction of movement of the screen 410 at the printing station E.

As at first printing station C, the squeegee 425 at station E is in its lowered or screen-engaging position while printing occurs and is raised for the return stroke of the screen 410, back toward median station D. At station E, as well as at station C, the return strokes of the screens 410, will occur while the turret is being incrementally rotated. As the arms 325 of the arm driving means are moved in coordinated unison with the screens 410 by a common drive mechanism, the return strokes of arms 325 at each printing station will also occur while the turret plate 101 is being rotated to advance arm means 2 from one station to another. Such simultaneous return strokes, of course, bring the abutments 313 and the shoes 327 at stations C and E from their position of arm means socket and bottle end disengagement at or near one arc extremity back to their other arc extremity positions for arm means socket and bottle end engagement with a succeeding arm means.

Through the coordinating effect of a common and conventional drive mechanism, or possibly through the carefully coordinated operation of separate drive mechanisms, the pivot shafts 202 of the arm means 2 at stations C and E are pivoted in unison at the same rate but in opposite directions so that the arm means 2 at these stations move symmetrically, i.e. in a generally mirror-image movement relationship, with respect to a vertical median plane passing through the axis of rotation of the turret plate 101 and the stations D and A. Similarly, the screens 410 at stations C and E move horizontally in unison at the same rate while retaining a generally symmetrical, or mirror-image, movement relationship with respect to this median plane.

FIGURE 1 reflects the symmetrical movement relationships of the arm means and screen printing means at the stations C and E with the bottle supporting arms 225 at each printing station being generally vertically aligned during the midpoint of their arcuate travel.

After the bottle surface $b$ has been printed, the arm driving means 3 at the printing station E is disengaged from the arm means 2 and its supported bottle at this station. The arm means 2 then comes to a position of rest with the arm 225 disposed at a clockwise travel extremity, as defined by a stop pin 212.

At bottle unloading station F the bottle neck interior gripping fingers 239 are collapsed against the piston rod 234 so as to allow the bottle to be generally axially withdrawn from the arm means 2. While at station F, the arm means 2 is locked in place by its brake pin 217.

In describing the manipulations of a bottle during the printing of two of its surfaces, reference has repeatedly been made to particular orientations of the bottle and orientations of apparatus elements. Such orientations, of course, encompass and recognize the minor departures from perfection which are a necessary part of commercial printing operations and are within the margins of error which permit the printing of commercially acceptable products.

Reference has also been made to symmetrical movement relations which exist between arm means, arm driving means, and screen printing means at printing stations C and E. Such symmetry of movement, of course, does not necessarily connote true symmetry of all structural elements, but rather indicates general symmetry of movement initiation and termination positions and of movement velocities between these positions.

At various points during a complete printing cycle, pressurized air is to be supplied to apparatus components such as the cylinders 230, 508 and 514 and the conduit 243. With the benefit of the foregoing description, the timing of the supplying of such pressurized air will be obvious to those skilled in the printing art. It will also be obvious that a variety of conventional flow control systems may be employed which, for example, may include switches and valves operated in response to movements of the major apparatus components heretofore described.

*Summary of some major advantages of the invention*

The utilization of a rotatable and reciprocable, plural arm supporting, turret in conjunction with the utilization of each swinging stroke of each arm to effect the printing of a bottle surface yields an unusually high speed printing operation. In addition, this combination concept provides highly accurate and quality controlled bottle printing.

The basic concept of printing one bottle surface while a bottle supporting arm swings in one direction and then printing another bottle surface while the arm swings in another direction minimizes printing apparatus manipulations and in and of itself substantially conserves on the overall time involved in a printing operation.

The symmetrical or mirror image related movements of two arm means, two arm driving means, and two reciprocating printing screens tends to balance torsional forces imposed on the turret assembly and thus minimizes power requirements, improves printing speed and accuracy, and minimizes the possibility of mechanical failures or inaccuracies in the printing operations, and minimizes the possibility of undesired turret movement during printing operations.

The utilization of separate, arm driving means to actuate turret carried arms provides a uniquely reliable and effective drive concept which contributes to high speed operations and minimizes complexity and speed reducing weight on the movable turret. The structure of the disclosed arm driving means is significant in and of itself in view of its basic simplicity, versatility, reliability, and ease of installation and adjustment.

The simplified but highly effective bottle neck gripping structure herein described provides an effective mechanism for supporting a bottle in a cantilever fashion while it is being moved between work stations. The expanding fingers of this bottle gripping structure may effectively grip the interior of a bottle neck so as to cammingly secure it against a bottle stabilizing and centering, frustoconical face.

The movable pin control structure affords a reliable but structurally simple safety mechanism to control the operation of printing stations in the event of the improper loading of bottles on arms or the failure to load bottles all together.

The unique bottle rotating structure, while characterized by overall structural simplicity, provides a particularly reliable bottle engaging and rotating action and may eliminate the necessity for resetting movements between each bottle reorientation.

The triple bearing, swivel mounted, connector structures utilized in drive portions of the apparatus yield especially positive mechanical connections. These connectors are especially resistive to wear tendencies which would adversely affect the coordinated and precisely interrelated movement of apparatus components.

Of no little significance is the manner in which the overall apparatus is uniquely adapted to successfully handle and print two surfaces of articles of a variety of sizes and shapes.

*Scope of Invention*

In describing the inventions, reference has been made to preferred apparatus embodiments and their modes of operation. Those familiar with the disclosure of these embodiments and techniques and skilled in the printing art may well recognize additions, deletions, substitutions or other modifications involving the disclosed inventions, which modifications would lie within the purview of the inventions deemed to be defined in the appended claims.

We claim:

1. A method of forming indicia on at least two arcuate article surfaces having different axes of cylindrical curvature, said method comprising:

mounting an article on an arm having engaging means for supporting said article such that the axis of cylindrical curvature of a first article surface to receive indicia substantially coincides with a pivot axis of said arm;

pivoting said article about said pivot axis so that said article is moved through an arc in one direction so as to move said first article surface in tangential, indicia-forming contact with indicia-forming means;

changing the position of said article while on said arm such that the axis of cylindrical curvature of a second article surface to receive indicia substantially coincides with said pivot axis of said arm; and pivoting said article about said pivot axis such that said article is moved through an arc in a direction opposite to said one direction so as to move said second article surface in tangential, indicia-forming contact with indicia-forming means.

2. An apparatus for forming indicia on at least two arcuate article surfaces having different axes of cylindrical curvature, said apparatus comprising: an arm having engaging means for supporting an article on said arm such that the axis of cylindrical curvature of a first article surface to receive indicia substantially coincides with a pivot axis;

means for pivoting said article about said pivot axis so that said article is moved through an arc in one direction so as to move said first article surface in tangential, indicia-forming contact with indicia-forming means;

means for changing the position of said article while on said arm such that the axis of cylindrical curvature of a second article surface to receive indicia substantially coincides with said pivot axis; and means for pivoting said article about said pivot axis such that said article is moved through an arc in a direction opposite to said one direction so as to move said second article surface in tangential, indicia-forming contact with indicia-forming means.

3. An apparatus for forming indicia on at least two arcuate article surfaces having different axes of cylindrical curvature, said apparatus comprising means for supporting an article such that the axis of cylindrical curvature of a first article surface to receive indicia substantially coincides with a pivot axis; wherein said article supporting means comprises turret means having a general vertical axis of rotation, and a plurality of article engaging arm means pivotably connected to said turret means, with each arm means having a generally horizontal pivot axis extending generally radially of the axis of rotation of said turret means; means for pivoting said article about said pivot axis so that said article is moved through an arc in one direction so as to move said first article surface in tangential, indicia-forming contact with indicia-forming means; wherein said means for moving an article through an arc in one direction comprises first arm driving means adjacent said turret means adapted to individually and sequentially engage and pivot each arm means on said turret means when said turret means is stationary and when each arm means is generally radially aligned with said first arm driving means with reference to said turret axis of rotation, with said first arm driving means being adapted to be disengaged from each of said arm means when said turret means is stationary whereby said turret means may be rotated about its axis of rotation;

means for changing the position of said article on said article supporting means such that the axis of cylindrical curvature of a second article surface to receive indicia substantially coincides with said pivot axis; means for pivoting said article about said pivot axis such that said article is moved through an arc in a direction opposite to said one direction so as to move said second article surface in tangential, indicia-forming contact with indicia forming means; wherein said means for moving an article through an arc in a direction opposite to said one direction comprises second arm driving means adjacent said turret means adapted to individually and sequentially engage and pivot each arm means on said turret means when said turret means is stationary and when each arm means is generally radially aligned with said second arm driving means with reference to said turret axis of rotation, with said second arm driving means being adapted to be disengaged from each of said arm means when said turret means is stationary whereby said turret means may be rotated about its axis of rotation; and wherein said indicia-forming means comprises first screen printing means mounted for generally horizontal reciprocation; second screen printing means mounted for generally horizontal reciprocation; means for causing said first and second screen printing means to undergo reciprocating movement, with said first screen printing means and second screen printing means moving in a generally symmetrical movement relationship with respect to a median plane through said axis of rotation of said turret means.

4. An apparatus as described in claim 3 wherein each arm means includes:
   a pivot shaft;
   an arm assembly connected to said pivot shaft for unitary, rotary movement therewith;
   abutment means carried by said pivot shaft for unitary, rotary movement therewith;
   first, stationary stop means on one side of said abutment means to limit rotation of said pivot shaft in one direction and define a position of engagement of said first arm driving means with said arm means;
   second, stationary stop means on the other side of said abutment means to limit rotation of said pivot shaft in a direction opposite to said one direction and define a position of engagement of said second arm driving means with said arm means;
   tension spring means having one end connected with said abutment means on one side of said shaft and extending to a generally opposite side of said shaft; and
   anchor means to which the end of said tension spring means opposite to said one end is connected, said anchor means being disposed on said opposite side of said shaft in general alignment with a plane extending through the axis of said pivot shaft and passing between and spaced from said first and second, stationary stop means.

5. An apparatus as described in claim 3 wherein each of said arm means includes:
   cylinder means;
   piston means disposed within said cylinder means;
   means for supplying pressurized fluid to the interior of said cylinder means to move said piston means axially thereof;
   piston rod means extending from said piston means to the exterior of said cylinder means;
   cam means carried by and defining an enlargement of said piston rod means; and
   a plurality of article engaging fingers, each of said fingers being pivotally mounted at one end adjacent said piston rod means and spring-biased so as to cause the opposite end thereof to move toward the axis of said piston rod means;
   said cam means, when moved toward said cylinder means, being adapted to engage said opposite ends of said fingers so as to pivot said fingers away from the axis of said piston rod means into engagement with wall portions of an article cavity.

6. An apparatus as described in claim 3 wherein said means for changing the position of an article comprises:
   article engaging means mounted for reciprocating movement;
   first cylinder means;
   first, fluid actuated, piston means housed by said first cylinder means;
   a swivel connection between said first piston rod means and said article engaging means adapted to enable rotation of said article engaging means about the reciprocation axis of said piston means while said piston means remains stationary;
   first gear means;
   second gear means mounted on said article engaging means for unitary rotation therewith;
   said first and second gear means being adapted to remain in meshing relationship while said article engaging means undergoes said reciprocating movement;
   second cylinder means;
   first pivot means supporting said second cylinder means;
   second, fluid actuated, piston means housed by said second cylinder means; and
   second pivot means connecting said second piston rod means to said first gear means.

7. An apparatus as described in claim 3 including a mechanism for causing reciprocation of each of said first and second, screen printing means, each said mechanism comprising:
   a pivoted lever;
   a reciprocable drive rod;
   first connecting means for connecting one portion of said lever on one side of its pivot axis with a screen printing means; and
   second connecting means for connecting another portion of said lever on the side of its pivot axis, opposite to said one side, with said reciprocable drive rod;
   each of said first and second connecting means including;
      a bearing assembly comprising two roller bearings adapted to engage one side of a portion of said lever and a third roller bearing adapted to engage the opposite side of said portion of said lever;
      said third roller bearing having an axis of rotation disposed in a median plane extending between said first and second roller bearings; and
      pivot means supporting said bearing assembly;
      said lever portion being in slidable engagement with said first, second and third roller bearings with the axis of rotation of each of said roller bearings being parallel to the pivot axis of said lever.

8. An apparatus as described in claim 3 including:
   disc means mounted for rotation with said turret means;
   a plurality of pins carried by said disc means and movable in a direction parallel to the axis of rotation of said turret means;
   photo-electric sensing means for determining the absence of an article on said arm means;
   pivotable, hammer means for engaging and moving individual pins from their original positions in response to a determination of the absence of an article on an arm means by said photo-electric sensing means;
   fluid actuated piston means for pivoting said hammer means to move an individual pin in response to a determination by said photo-electric sensing means of the absence of an article on an arm means;
   a plurality of switch means, with each switch means being adapted to control the operation of an individual screen printing means and being further adapted to be actuated by a pin which has been moved by said hammer means in response to said absence of an article on an arm means; and means for restoring moved pins to their original positions subsequent to their actuations of said switch means.

9. An apparatus as described in claim 3 wherein each of said first and second, arm driving means includes:

arm engaging means mounted for reciprocating movement in a direction extending generally radially of the axis of rotation of said turret means; and means for imparting pivotable movement to said arm engaging means about an axis extending generally radially of the axis of rotation of said turret means.

10. An apparatus as described in claim 9 wherein said arm engaging means comprises a cylindrical sleeve mounted for axial reciprocation;

article end engaging means mounted for unitary reciprocating movement with said sleeve;

a generally L-shaped member having a first leg portion connected to said sleeve for unitary reciprocating movement therewith and a second leg portion spaced from said sleeve and projecting generally toward said turret means, and an abutment member carried on the free end of said second leg portion and adapted to engage said arm means; and wherein said means for imparting pivotable movement to said arm engaging means comprises gear means mounted coaxially with said sleeve and mounted for unitary, rotary movement with said L-shaped member; and reciprocable, toothed rack means meshingly engaged with said gear means.

11. An apparatus as described in claim 10 wherein:

each arm means includes socket means adapted to receive said abutment member when the axis of said sleeve and the pivot axis of each arm means are generally aligned whereby pivotable movement of said sleeve about its axis may induce pivotable movement of said arm means about its pivot axis.

12. An apparatus as described in claim 11 including:

drive shaft means having a generally vertical axis of rotation;

bar means mounted for unitary movement with said toothed rack means and having a longitudinal and horizontal axis generally perpendicular to the reciprocation direction of said toothed rack means;

slide means mounted for longitudinal sliding movement on said bar means;

swivel means connected to said slide means and having a swivel axis extending generally parallel to the axis of rotation of said drive shaft means;

crank means rigidly connected to said drive shaft means and extending to and connected with said swivel means;

cam means carried by said drive shaft means; and pivotable lever means having a pivot axis parallel to the axis of rotation of said drive shaft means and having one lever portion engaged with said cam means and another lever portion connected with said sleeve, with said cam means being configured to effect pivotable movement of said lever means about its pivot axis in alternately opposite directions in response to continuous rotation of said drive shaft means, and with said lever means being connected to said sleeve so as to effect reciprocating movement of said sleeve in response to said alternating, pivotable movement of said lever means.

13. A printing apparatus comprising:
turret means;
a plurality of article engaging means connected with said turret means;
first, screen printing means mounted for reciprocation;
second, screen printing means mounted for reciprocation; and article position changing means disposed adjacent said turret means and between said first and second printing means, said article positon changing means being adapted to sequentially engage articles supported by each of said article engaging means and rotate said articles about their central axes; and means for causing said first and second, screen printing means to undergo reciprocating movement with said first screen printing means and said second screen printing means moving in a generally symmetrical movement relationship with respect to a median plane through said axis of rotation of said turret means and with said screen printing means moving in tangential, printing contact with articles engaged by at least some of said article engaging means.

14. A printing apparatus for forming indicia on at least two arcuate article surfaces having different axes of cylindrical curvature comprising:

transporting means;

a plurality of article engaging arm means pivotably connected with said transporting means, and adapted to pivot about axes substantially coinciding with said axes of cylindrical curvature of said article;

arm driving means adjacent said transporting means adapted to individually and sequentially engage and pivot each arm means on said transporting means when said transporting means is stationary, with said arm driving means being adapted to be sequentially engaged and disengaged from successive arm means.

15. A mechanism for connecting two relatively movable members, said mechanism comprising:

a rotatable bearing assembly comprising two roller bearings adapted to engage one side of one member and a third roller bearing adapted to engage the opposite side of said one member;

said third roller bearing having an axis of rotation disposed in a median plane extending between said first and second roller bearings; and pivot means located centrally within said bearing assembly and connecting said bearing assembly to another member;

said one member being in slidable engagement with said first, second and third roller bearings.

16. An apparatus for supporting articles to be printed, said apparatus comprising:

cylinder means;

piston means disposed within said cylinder means;

means for supplying pressurized fluid to the interior of said cylinder means to move said piston means axially thereof;

piston rod means extending from said piston means to the exterior of said cylinder means;

cam means carried by and defining an enlargement of said piston rod means; and a plurality of article engaging fingers, each of said fingers being pivotally mounted at one end adjacent said piston rod means and spring-biased so as to cause the opposite end thereof to move toward the axis of said piston rod means;

said cam means, when moved toward said cylinder means, being adapted to engage said opposite ends of said fingers so as to pivot said fingers away from the axis of said piston rod means into engagement with wall portions of an article cavity.

17. In an apparatus for performing a series of manipulative work steps on sequentially supplied articles, the improvement comprising:

article transporting means;

mechanical article holding means carried by said article transporting means;

a plurality of work stations;

movable abutment means carried with said article transporting means and operable independent of said article holding means;

article sensing means for determining the condition of said article holding means with respect to an article, and operable independent of said article holding means;

means for engaging and moving said abutment means in response to a determination of the condition of said article holding means by said article sensing means; and a plurality of control means, with each control means being adapted to control the operation of a separate work station, each said control means being adapted to be actuated by an abutment means which has been engaged and moved in response to the condition of an article holding means.

18. An apparatus for forming indicia on at least two arcuate article surfaces having different axes of cylindrical curvature, said apparatus comprising:

article transporting means;

a plurality of arm means pivotally connected with said transporting means;

arm driving means disposed adjacent said transporting means and adapted to individually and sequentially engage and pivot each arm means on said transporting means about axes substantially coinciding with said axes of cylindrical curvature of said article, with said arm driving means being adapted to be sequentially disengaged from each of said arm means and engaged with a succeeding arm means, said arm driving means including arm engaging means mounted for reciprocating movement in a direction extending generally toward and away from said transporting means; and means for imparting pivotable movement to said arm engaging means about an axis coaxially aligned with the pivot axis of an arm means while said arm engaging means is engaged therewith.

19. An apparatus for changing the position of an article, said apparatus comprising:

article engaging means mounted for reciprocating movement;

first cylinder means;

first, fluid actuated, piston means housed by said first cylinder means;

a swivel connection between said first piston rod means and said article engaging means adapted to enable rotation of said article engaging means about the reciprocation axis of said piston means while said piston means remains stationary;

first gear means;

second gear means mounted on said article engaging means for unitary rotation therewith;

said first and second gear means being adapted to remain in meshing relationship while said article engaging means undergoes said reciprocating movement;

second cylinder means;

first pivot means supporting said second cylinder means;

second, fluid actuated, piston means housed by said second cylinder means; and second pivot means connecting said second piston rod means to said first gear means.

20. An apparatus for printing at least two arcuate article surfaces having different axes of cylindrical curvature, said apparatus comprising:

turret means having an axis of rotation;

a plurality of pivotable arm means carried in spaced relation on said turret means, each said arm means having a pivot axis extending generally radially of the axis of rotation of said turret means and having an article engaging portion spaced radially from said pivot axis;

first printing means mounted adjacent said turret means;

second printing means spaced from said first printing means and mounted adjacent said turret means;

first arm driving means disposed adjacent said turret means and adapted to sequentially engage each of said arm means, pivot each of said arm means in one direction so that a first surface of an article engaged thereby is moved in tangential indicia forming contact with said first printing means, and disengage each of said arm means;

second arm driving means disposed adjacent said turret means and adapted to sequentially engage each of said arm means and pivot each of said arm means in a direction opposite to said one direction so that a second surface of an article carried thereby is moved in tangential indicia forming contact with said second printing means, and disengage each of the said arm means;

article position changing means disposed adjacent said turret means and between said first and second printing means, said article position changing means being adapted to sequentially engage articles supported by each of said arm means and rotate said articles about their central axes; and means for reciprocably moving said turret means along its axis of rotation whereby articles carried on two different arm means may be moved in unison toward said first and second printing means, said two arm articles may be moved in unison in tangential indicia forming contact with said first and second printing means, and said two articles may be moved in unison away from said first and second printing means and said turret rotated about its axis of rotation with said articles displaced from said first and second printing means.

References Cited by the Examiner

UNITED STATES PATENTS

| | | | |
|---|---|---|---|
| 2,690,118 | 9/1954 | Schwartz et al. | 101—123 X |
| 2,884,791 | 5/1959 | Enstrom | 74—107 X |
| 2,885,957 | 5/1959 | Hansen | 101—124 |
| 3,019,725 | 2/1962 | Freeman | 101—38 |
| 3,159,100 | 12/1964 | Marquiss | 101—40 |
| 3,181,457 | 5/1965 | Eldred et al. | 101—124 |

ROBERT E. PULFREY, *Primary Examiner.*

W. McCARTHY, *Assistant Examiner.*